US008229753B2

(12) United States Patent
Galanes et al.

(10) Patent No.: US 8,229,753 B2
(45) Date of Patent: Jul. 24, 2012

(54) WEB SERVER CONTROLS FOR WEB ENABLED RECOGNITION AND/OR AUDIBLE PROMPTING

(75) Inventors: Francisco M. Galanes, Kirkland, WA (US); Hsiao-Wuen Hon, Bellevue, WA (US); James D. Jacoby, Snohomish, WA (US); Renaud J. Lecoueche, Bellevue, WA (US); Stephen F. Potter, Seattle, WA (US); Susan M. Warren, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 10/046,131

(22) Filed: Oct. 21, 2001
(Under 37 CFR 1.47)

(65) Prior Publication Data
US 2003/0200080 A1   Oct. 23, 2003

(51) Int. Cl.
*G10L 15/22* (2006.01)
*G06F 3/16* (2006.01)

(52) U.S. Cl. .............. 704/270.1; 704/275; 715/727; 715/760

(58) Field of Classification Search .......... 704/270, 704/270.1, 275; 715/727, 760
See application file for complete search history.

(56) References Cited

U.S. PATENT DOCUMENTS

| 4,831,550 A | 5/1989 | Katz |
| 4,945,566 A | 7/1990 | Mergel et al. |
| 4,947,438 A | 8/1990 | Paeseler |
| 5,263,117 A | 11/1993 | Nadas et al. |
| 5,303,327 A | 4/1994 | Sturner et al. |
| 5,357,596 A | 10/1994 | Takebayashi et al. |
| 5,384,892 A | 1/1995 | Strong |
| 5,477,451 A | 12/1995 | Brown et al. |
| 5,502,774 A | 3/1996 | Bellegarda et al. |
| 5,559,897 A | 9/1996 | Brown et al. |
| 5,566,272 A | 10/1996 | Brems et al. |
| 5,615,296 A | 3/1997 | Stanford et al. |
| 5,664,061 A | 9/1997 | Andreshak et al. |
| 5,680,511 A | 10/1997 | Baker et al. |
| 5,689,617 A | 11/1997 | Pallakoff et al. |
| 5,710,866 A | 1/1998 | Alleva et al. |
| 5,737,489 A | 4/1998 | Chou et al. |
| 5,752,052 A | 5/1998 | Richardson et al. |
| 5,765,133 A | 6/1998 | Antoniol et al. |
| 5,774,628 A | 6/1998 | Hemphill |
| 5,819,220 A | 10/1998 | Sarukkai et al. |
| 5,829,000 A | 10/1998 | Huang et al. |
| 5,835,888 A | 11/1998 | Kanevsky et al. |
| 5,890,123 A * | 3/1999 | Brown et al. .............. 704/270.1 |

(Continued)

FOREIGN PATENT DOCUMENTS

EP    0645757 A1    3/1995

(Continued)

OTHER PUBLICATIONS

Mit et al., "Grammar Representation Requirements for Voice Markup Languages", W3C Working Draft, Dec. 23, 1999.

(Continued)

*Primary Examiner* — Martin Lerner
(74) *Attorney, Agent, or Firm* — Merchant & Gould

(57) ABSTRACT

Web server controls are provided for generating client side markups with recognition and/or audible prompting. Three approaches are disclosed for implementation of the controls.

51 Claims, 11 Drawing Sheets

U.S. PATENT DOCUMENTS

| | | | |
|---|---|---|---|
| 5,899,973 A | 5/1999 | Bandara et al. | |
| 5,905,972 A | 5/1999 | Huang et al. | |
| 5,913,193 A | 6/1999 | Huang et al. | |
| 5,915,001 A | 6/1999 | Uppaluru | |
| 5,937,384 A | 8/1999 | Huang et al. | |
| 5,960,399 A | 9/1999 | Barclay et al. | |
| 6,073,091 A | 6/2000 | Kanevsky et al. | |
| 6,078,886 A | 6/2000 | Dragosh et al. | |
| 6,081,799 A | 6/2000 | Beavin et al. | |
| 6,097,305 A | 8/2000 | Im et al. | |
| 6,101,472 A | 8/2000 | Giangarra et al. | |
| 6,138,139 A * | 10/2000 | Beck et al. | 709/202 |
| 6,141,641 A | 10/2000 | Hwang et al. | |
| 6,154,722 A | 11/2000 | Bellegarda | |
| 6,157,912 A | 12/2000 | Kneser et al. | |
| 6,167,398 A | 12/2000 | Wyard et al. | |
| 6,182,039 B1 | 1/2001 | Rigazio et al. | |
| 6,188,976 B1 | 2/2001 | Ramaswamy | |
| 6,188,985 B1 | 2/2001 | Thrift et al. | |
| 6,192,338 B1 | 2/2001 | Haszto et al. | |
| 6,203,495 B1 | 3/2001 | Bardy | |
| 6,240,391 B1 | 5/2001 | Ball et al. | |
| 6,243,443 B1 | 6/2001 | Low et al. | |
| 6,269,336 B1 | 7/2001 | Ladd et al. | 704/270 |
| 6,311,151 B1 * | 10/2001 | Yamamoto et al. | 704/8 |
| 6,314,402 B1 | 11/2001 | Monaco et al. | |
| 6,349,132 B1 | 2/2002 | Wesemann et al. | |
| 6,366,886 B1 | 4/2002 | Dragosh et al. | |
| 6,377,917 B1 * | 4/2002 | Gimenez de los Galanes et al. | 704/220 |
| 6,384,829 B1 | 5/2002 | Prevost et al. | |
| 6,385,583 B1 | 5/2002 | Ladd et al. | |
| 6,405,170 B1 | 6/2002 | Phillips et al. | |
| 6,434,524 B1 | 8/2002 | Weber | |
| 6,442,523 B1 * | 8/2002 | Siegel | 704/270 |
| 6,445,776 B1 * | 9/2002 | Shank et al. | 379/88.1 |
| 6,453,290 B1 | 9/2002 | Jochumson | |
| 6,456,974 B1 | 9/2002 | Baker et al. | |
| 6,463,413 B1 | 10/2002 | Applebaum et al. | |
| 6,493,719 B1 * | 12/2002 | Booth et al. | 704/223 |
| 6,496,799 B1 | 12/2002 | Pickering | |
| 6,526,380 B1 | 2/2003 | Thelen et al. | |
| 6,539,359 B1 | 3/2003 | Ladd | |
| 6,564,207 B1 | 5/2003 | Abdoh | |
| 6,564,263 B1 | 5/2003 | Bergman et al. | |
| 6,570,078 B2 | 5/2003 | Ludwig | |
| 6,587,822 B2 | 7/2003 | Brown | |
| 6,604,075 B1 * | 8/2003 | Brown et al. | 704/270.1 |
| 6,615,111 B2 | 9/2003 | Tackett et al. | |
| 6,662,163 B1 | 12/2003 | Albayrak et al. | |
| 6,689,947 B2 | 2/2004 | Ludwig | |
| 6,690,772 B1 | 2/2004 | Naik et al. | |
| 6,717,593 B1 * | 4/2004 | Jennings | 715/760 |
| 6,718,015 B1 | 4/2004 | Berstis | |
| 6,728,679 B1 | 4/2004 | Strubbe et al. | |
| 6,745,163 B1 | 6/2004 | Brocious et al. | |
| 6,757,655 B1 | 6/2004 | Besling et al. | |
| 6,785,649 B1 | 8/2004 | Hoory | |
| 6,785,653 B1 | 8/2004 | White | |
| 6,839,896 B2 * | 1/2005 | Coffman et al. | 719/310 |
| 6,868,383 B1 | 3/2005 | Bangalore et al. | |
| 6,944,592 B1 | 9/2005 | Pickering | |
| 6,950,850 B1 * | 9/2005 | Leff et al. | 709/203 |
| 6,965,864 B1 | 11/2005 | Thrift et al. | |
| 7,003,463 B1 | 2/2006 | Maes | 704/275 |
| 7,003,464 B2 | 2/2006 | Ferrans | |
| 7,020,609 B2 | 3/2006 | Thrift et al. | |
| 7,020,841 B2 * | 3/2006 | Dantzig et al. | 715/727 |
| 7,028,306 B2 * | 4/2006 | Boloker et al. | 719/310 |
| 7,062,437 B2 | 6/2006 | Kovales et al. | |
| 7,158,779 B2 | 1/2007 | Hon et al. | |
| 7,257,575 B1 | 8/2007 | Johnston et al. | |
| 7,260,535 B2 * | 8/2007 | Galanes et al. | 704/270 |
| 7,363,027 B2 | 4/2008 | Hon et al. | |
| 7,409,349 B2 * | 8/2008 | Wang et al. | 704/270.1 |
| 7,505,908 B2 | 3/2009 | Johnston et al. | |
| 7,506,022 B2 * | 3/2009 | Wang et al. | 709/203 |
| 7,539,656 B2 | 5/2009 | Fratkina et al. | |
| 7,552,055 B2 | 6/2009 | Lecoeuche | |
| 7,610,547 B2 | 10/2009 | Wang et al. | |
| 7,640,164 B2 | 12/2009 | Sasaki et al. | |
| 7,711,570 B2 * | 5/2010 | Galanes et al. | 704/277 |
| 7,805,704 B2 * | 9/2010 | Galanes et al. | 717/107 |
| 7,814,501 B2 * | 10/2010 | Lecoeuche et al. | 719/315 |
| 7,853,453 B2 | 12/2010 | Potter | |
| 7,873,523 B2 | 1/2011 | Potter et al. | |
| 8,160,883 B2 | 4/2012 | Lecoeuche | |
| 8,165,883 B2 | 4/2012 | Galanes et al. | |
| 2001/0034603 A1 | 10/2001 | Thrift et al. | |
| 2002/0003547 A1 | 1/2002 | Wang et al. | |
| 2002/0009517 A1 | 1/2002 | Degady | |
| 2002/0010584 A1 | 1/2002 | Schultz | |
| 2002/0010715 A1 | 1/2002 | Chinn | |
| 2002/0031756 A1 | 3/2002 | Holtz et al. | |
| 2002/0035474 A1 | 3/2002 | Alpdemir | |
| 2002/0042711 A1 | 4/2002 | Lin | |
| 2002/0065652 A1 | 5/2002 | Kushida et al. | |
| 2002/0077823 A1 | 6/2002 | Fox et al. | |
| 2002/0091518 A1 | 7/2002 | Baruch et al. | |
| 2002/0107891 A1 | 8/2002 | Leamon et al. | |
| 2002/0113908 A1 | 8/2002 | Sprowson | |
| 2002/0128845 A1 | 9/2002 | Thomas et al. | |
| 2002/0154124 A1 * | 10/2002 | Han | 345/473 |
| 2002/0165719 A1 | 11/2002 | Wang | |
| 2002/0169806 A1 | 11/2002 | Wang | |
| 2002/0173961 A1 | 11/2002 | Guerra | |
| 2002/0178008 A1 | 11/2002 | Reynar | |
| 2002/0194388 A1 | 12/2002 | Boloker et al. | |
| 2002/0198719 A1 | 12/2002 | Gergic | |
| 2003/0009517 A1 | 1/2003 | Wang et al. | |
| 2003/0065505 A1 | 4/2003 | Johnston et al. | |
| 2003/0088421 A1 | 5/2003 | Maes | |
| 2003/0125944 A1 | 7/2003 | Wohlsen et al. | |
| 2003/0130854 A1 | 7/2003 | Galanes et al. | |
| 2003/0137537 A1 | 7/2003 | Guo et al. | |
| 2003/0171924 A1 | 9/2003 | Bi | |
| 2003/0200080 A1 | 10/2003 | Galanes et al. | |
| 2003/0225825 A1 | 12/2003 | Healey et al. | |
| 2004/0073431 A1 | 4/2004 | Galanes et al. | |
| 2004/0078201 A1 | 4/2004 | Porter | |
| 2004/0083092 A1 | 4/2004 | Valles | |
| 2004/0113908 A1 | 6/2004 | Galanes et al. | |
| 2004/0117804 A1 | 6/2004 | Scahill et al. | |
| 2004/0138890 A1 | 7/2004 | Ferrans et al. | |
| 2004/0192273 A1 | 9/2004 | AuYeung | |
| 2004/0230434 A1 | 11/2004 | Galanes | |
| 2004/0230637 A1 | 11/2004 | Lecoeuche | |
| 2005/0091059 A1 * | 4/2005 | Lecoeuche | 704/270.1 |
| 2005/0135571 A1 | 6/2005 | Bangalore et al. | |
| 2005/0154591 A1 | 7/2005 | Lecoeuche | |
| 2005/0203747 A1 | 9/2005 | Lecoeuche | |

FOREIGN PATENT DOCUMENTS

| | | |
|---|---|---|
| EP | 0687987 A1 | 12/1995 |
| EP | 0834862 | 9/1997 |
| EP | 0854418 | 1/1998 |
| EP | 0872827 | 10/1998 |
| EP | 1199630 A2 | 4/2002 |
| EP | 1209662 | 5/2002 |
| JP | 10-116094 | 5/1998 |
| JP | 10-240493 | 9/1998 |
| JP | 11-110186 | 4/1999 |
| JP | 2001-42890 | 2/2001 |
| JP | 2001-154852 | 6/2001 |
| JP | 2002-524806 | 8/2002 |
| JP | 2003-044093 | 2/2003 |
| JP | 2003-067177 | 3/2003 |
| JP | 2003-131772 | 5/2003 |
| WO | WO 96/41333 | 12/1996 |
| WO | WO 98/34180 | 9/1998 |
| WO | WO 00/05643 | 2/2000 |
| WO | WO 00/14728 | 3/2000 |
| WO | WO 01/26093 | 4/2001 |
| WO | WO 01/93249 A1 | 12/2001 |

OTHER PUBLICATIONS

VoiceXML Forum, Version 1.00, Mar. 7, 2000, pp. 1-101.
Hemphill C.T. And Thrift P.R.: "Surfing the WEB by Voice" Proceedings ACM Multimedia, Nov. 1995, pp. 215-222.
Using the HTML Converter, Sun Microsystems, Jun. 8, 2001.
JavaServer Pages ™ Technology-Frequently Asked Questions, Sun Microsystems, Aug. 27, 1999.
Script-Client-side Script, Web Design Group, May 13, 1998.
XML and XSL from servers to cell-phones, Ramin Firoozye and Ranbir Chawla, Sep. 2, 1998.
Telephones, http://www.fusionanomaly.net/telephones.html , Oct. 30, 2000.
SpeechObjects Specification V1.0, W3C Note, Nov. 2000.
McTear, Michael F.,"Spoken Dialogue Technology: Enabling the Conversational User Interface", ACM Computing Surveys (CSUR), Mar. 2002, vol. 34, Issue 1, pp. 90-169.
Capra, Robert, et al. "Posters & Demos: WebContext: Remote Access to Shared Context", Proceedings of the 2001 Workshop on Perceptive User Interfaces, Nov. 2001, pp. 1-9.
Lucas, Bruce, "VoiceXML for Web-based Distributed Conversational Applications", Communications of the ACM,vol. 43, Issue 9, Sep. 2000, pp. 53-57.
Synchronized Multimedia Modules Based Upon SMIL 1.0, W3C, downloaded from: http://www.w3.orgt/TR/NOTE-SYMM-modules, Feb. 1999, pp. 1-8.
SALT, Speech Application Language Tags (SALT), 1.0 Specification, Jul. 15, 2002.
SALT, Speech Application Language Tags (SALT), 0.9 Specification, Feb. 19, 2002.
Communication and European Search Report from European Application No. 02023649.3, mailed Jul. 14, 2005.
Official Notice of Rejection of the Japanese Patent Office in related foreign application No. 2002-306353 filed Oct. 21, 2002.
Wikipedia, "Hash Table", 13 pages, Retrieved Oct. 22, 2009.
Masahiro Araki, et al., "Development of XML-VoiceXML Converter," IPSJ SIG Technical Report, vol. 2000, No. 119, pp. 191-196, 2000-SLP-34-33, Information Processing Society of Japan, Dec. 22, 2000.
VoiceXML Forum, Voice eXtensible Markup Language, Version 1.00, Mar. 7, 2000, pp. 1-101.
Wikipedia, "Hash Table," retrieved Nov. 5, 2007, 12 pages.
A. Gorin et al., "How may I help you?" Speech Comm., vol. 23, pp. 113-127, 1997.
A. Rudnicky et al., "SpeechWear: a mobile speech system," in Proc. ICSLP-96, Philadelphia, PA, Oct. 1996.
B. Souvignier et al., "The thoughtful elephant: strategies for spoken dialog systems," IEEE Trans. Speech and Audio Processing, 8(1), Jan. 2000.
C. Chelba, "A structured language model," in Proc. EACL-97, Madrid, Spain, Jul. 1997.
Daniele Falavigna, Roberto Gretter: "Flexible Mixed Initiative Dialogue over the Telephone Network," in Proceedings of ASRU 99, Keystone, Colorado, 12-15, Dec. 1999.
Database Inspec, 'Online!, Institute of Electrical Engineers, "Improvement of a Probabilistic CFG Using a Cluster-Based Language Modeling Technique," & "Methodologies for the Conception, Design, and Application of Intelligent Systems," Abstract 1996.
Dialogue speech recognition using syntactic rules based on subtrees and preterminal bigrams, Takezawa, Toshiyuki, Morimoto, Tsuyoshi Systems and Computers in Japan. vol. 28, No. 5, pp. 22-32, 1997.
Goodman, J.T., "Putting It All Together: Language Model Combination," Acoustics, Speech, and Signal Processing, 2000. ICASSP '00 Inern'l Conf. On, v. 3, pp. 1647-1650.
H. Ney, S. Ortmanns, "Dynamic programming search for continuous speech recognition," IEEE Signal Processing Magazine, pp. 64-83, 1999.
Huang, X., et al., "From Sphinx II to Whisper: Making Speech Recognition Usable, in Automatic Speech and Speaker Recognition," C.H. Lee, F.K. Soong, and K.K. Paliwal, Editors, 1996, Klewer Academic Publishers: Norwell, MA., pp. 481-508.
Kuansan Wang: "Semantic modeling for dialog systems in a pattern recognition framework" Proceedings of Automatic Speech Recognition and Understanding Workshop ASRU, 9, Dec. 2001, pp. 284-287.
K. Wang, "A plan-based dialog system with probabilistic inferences," in Proc. ISCLP-2000, Beijing China, 2000.
K. Wang, "Natural Language enabled Web applications," in Proc. 1st NLP and XML Workshop, Tokyo, Japan, Nov. 2001.
L. Bell, J. Gustafson, "Positive and negative user feedback in spoken dialog corpus," in Proc. ICSLP-2000, Beijing, China, Oct. 2000.
L. Cerrato, "A comparison between feedback strategies in human-to-human and human-machine communication," in Proc. ICSLP-2002, Denver, Co., Sep. 2002.
L. Ferrer et al., "Is the speaker done yet? Faster and more accurate end-of-utterance detection using prosody," in Proc. ISCP-2002, Denver, CO, Sep. 2002.
L. Huang, C. Yang, "A novel approach to robust speech endpoint detection in car environments," in Proc. ICASSP-2000, vol. 3, Istanbul, Turkey, Jun. 2000.
Lloyd-Thomas, H. et al., "An Integrated Grammar/Bigram Language Model Using Path Scores," Proceedings of the International Conference on Acoustics, Speech and Signal Processing, May 9, 1995, vol. 1, pp. 173-176.
Matsunaga et al., "Task Adaptation in Stochastic Language Models for Continuous Speech Recognition," IEEE Mar. 23, 1992, pp. I-165-I-268.
M.A. Walker et al., "DARPA Communicator Evaluation: Progress from 2000 to 2001," in Proc. ICSLP-2002, Denver, CO, Sep. 2002.
M.A. Walker et al., "Paradise: A framework for evaluating spoken dialog agents," in Proc. 35th ACL, 1997.
Mergel, A. et al., "Construction of Language Models for Spoken Database Queries," IEEE, 1987, pp. 844-847.
M. Mohri et al., "Weighted automata in text and speech processing," in Proc. ECAI-96 Workshop, Budapest, Hungary, 1996.
Moore, R., "Using Natural-Language Knowledge Sources in Speech Recognition," Computational Models of Speech Pattern Processing, Proceedings of Computational Models of Speech Pattern Processing, Jul. 1997, pp. 304-327.
Moore, R. et al., "Combining Linguistic and Statistical Knowledge Sources in Natural-Language Processing for Atis," in Proceedings of the ARPA Spoken Language Systems Technology Workshop, 1995, Morgan Kaufmann, Los Altos, CA, Austin, Texas.
N. Sawhney, C. Schmandt, "Nomadic radio: speech and audio interaction for contextual messaging in nomadic environments," ACM Trans. Computer-Human Interaction, 7(3), pp. 353-383, Sep. 2000.
Q. Li et al., "A robust real-time endpoint detector with energy normalization," in Proc. ICASSP-2001, vol. 1, Salt Lake City, UT, May 2001.
PJ Wyard et al., "Spoken Language Systems-Beyond Prompt and Response," BT Technology Journal, Jan. 1996, No. 1, pp. 187-205.
R. Sato et al., "Learning decision trees to determine turn-taking by spoken dialog systems," in Proc. ICSLP-2002, Denver, CO, Sep. 2002.
S.L. Oviatt, "Multimodal interactive maps: designing for human performance," Human Computer Interactions, vol. 12, pp. 93-129, 1997.
Takahiro Nakano et al.: "Investigation on speech interface for form-based information retrieval services on the WWW" IPSJ SIG Notes, Japan, the Information Processing Society of Japan, vol. 99, No. 14, p. 1-6 (Febuary 6, 1999).
Tsukada, H. et al., "Reliable Utterances Segment Recognition by Integrating a Grammary with Statistical Language Contstraints," Speech Communications, Elsevier Science Publishers, Dec. 1998, vol. 26, No. 4, pp. 299-309.
V. Zue et al., "Jupiter: A telephone-based conversational interface for weather information," IEEE Trans. Speech and Audio Processing, 8(1), Jan. 2000.
Wang, K: "Salt: A spoken language interface for web-based multimodal dialog systems," Proceedings of ICSLP 2002, International Conference on Spoken Language Processing, Sep. 16, 2002, pp. 2241-2244.
Ward, W. "Understanding Spontaneous Speech: The Phoenix System," Proceedings ICASSP, 1991, pp. 365-367.

Wang, K.: "Semantic object synchronous understanding in SALT for highly interactive user interface," Proceedings of Eurospeech 2003, 8th European Conference on Speech Communication and Technology, Sep. 1, 2003, pp. 1209-1212.

X. Huang et al., "MiPad: A next generation PDA prototype," in Proc. ICSLP-2000, Beijing, China, Oct. 2000.

XSL Transformations, http://www.w3.org/TR/xslt. Nov. 16, 1999.

YeYi Wang et al.: "A unified context-free grammar and n-gram model for spoken language processing" Proc. f IEEE ICASSP 2000, vol. 3, Jun. 5, 2000, pp. 1639-1642.

Communication pursuant to Article 96 (2) EPC, Application No. 04011317.7-2218 dated Jun. 1, 2005, 3 pages.

Communication with European Search Report dated Oct. 7, 2004, Application No. 04011317.7- 2218, 4 pages.

Official Notice of Rejection of the Japanese Patent Office mailed Apr. 22, 2008 in counterpart foreign application No. 2002-132053 filed May 7, 2002.

Official Search Report of the Japanese Patent Office mailed Dec. 14, 2007 in counterpart foreign application No. 2002-132053 filed May 5, 2002.

Official Search Report of the Japanese Patent Office mailed Feb. 27, 2007 in counterpart foreign application No. 2002-306353 filed Oct. 21, 2002.

U.S. Office Action mailed Nov. 28, 2006 in U.S. Appl. No. 10/426,027.

U.S. Office Action mailed Dec. 19, 2006 in U.S. Appl. No. 10/426,057.

U.S. Office Action mailed Jan. 3, 2007 in U.S. Appl. No. 10/426,053.

U.S. Patent and Trademark Office Action mailed Feb. 16, 2007 for U.S. Appl. No. 09/960,229, filed Sep. 20, 2001.

U.S. Office Action mailed Apr. 23, 2007 in U.S. Appl. No. 10/426,057.

U.S. Office Action mailed May 17, 2007 in U.S. Appl. No. 10/426,027.

U.S. Office Action mailed Jun. 25, 2007 in U.S. Appl. No. 10/426,053.

U.S. Office Action mailed Nov. 21, 2007 in U.S. Appl. No. 10/426,057.

U.S. Office Action mailed Jan. 24, 2008 in U.S. Appl. No. 10/426,053.

U.S. Office Action mailed Jan. 28, 2008 in U.S. Appl. No. 10/426,027.

U.S. Office Action mailed Sep. 11, 2008 in U.S. Appl. No. 10/755,623.

U.S. Office Action mailed Oct. 7, 2008 in U.S. Appl. No. 10/426,057.

U.S. Office Action mailed Oct. 30, 2008 in U.S. Appl. No. 10/426,053.

U.S. Office Action mailed Nov. 14, 2008 in U.S. Appl. No. 10/426,027.

U.S. Office Action mailed Apr. 17, 2009 in U.S. Appl. No. 10/426,057.

U.S. Office Action mailed Apr. 20, 2009 in U.S. Appl. No. 10/755,623.

U.S. Office Action mailed Jun. 8, 2009 in U.S. Appl. No. 10/426,053.

U.S. Office Action mailed Sep. 22, 2009 in U.S. Appl. No. 10/755,623.

U.S. Office Action mailed Nov. 23, 2009 in U.S. Appl. No. 10/426,057.

U.S. Office Action mailed Nov. 27, 2009 in U.S. Appl. No. 10/426,053.

U.S. Office Action mailed Dec. 10, 2009 in U.S. Appl. No. 10/426,027.

U.S. Office Action mailed Jan. 22, 2010 in U.S. Appl. No. 10/755,623.

U.S. Office Action mailed Jul. 6, 2010 in U.S. Appl. No. 10/755,623.

U.S. Office Action mailed Dec. 9, 2010 in U.S. Appl. No. 10/426,053.

U.S. Office Action mailed Dec. 23, 2010 in U.S. Appl. No. 10/755,623.

U.S. Office Action mailed Jan. 7, 2011 in U.S. Appl. No. 10/426,057.

U.S. Notice of Allowance mailed Aug. 9, 2011 in U.S. Appl. No. 10/426,057.

U.S. Notice of Allowance mailed Aug. 19, 2011 in U.S. Appl. No. 10/755,623.

Combination of Statistical and Rule-Based Approcahes for Spoken Language Understanding, YeYi Wang, Alex Acero, Ciprian Chelba, Brendan Frey and Leon Wong, Microsoft Research, One Microsoft Way, Redmond, Washington 98052, USA Elecetrical and Computer Engineering, University of Toronto, 2002, 4 pages.

K. Wang, "Proposal for Semantic Tagging for the Context Free Grammar Specification for the W3C Speech Interface Framework," http://www.w3org/voice/group/2000/ms-SemanticTag.html, 2000, retrieved May 11, 2004, 3 pages.

U.S. Notice of Allowance mailed Jun. 23, 2011 in U.S. Appl. No. 10/426,053, all pages.

U.S. Notice of Allowance mailed Nov. 7, 2011 in U.S. Appl. No. 10/426,057, all pages.

U.S. Notice of Allowance mailed Dec. 13, 2011 in U.S. Appl. No. 10/755,623, 34 pages.

U.S. Notice of Allowance mailed Dec. 27, 2011 in U.S. Appl. No. 10/426,053, 19 pages.

* cited by examiner

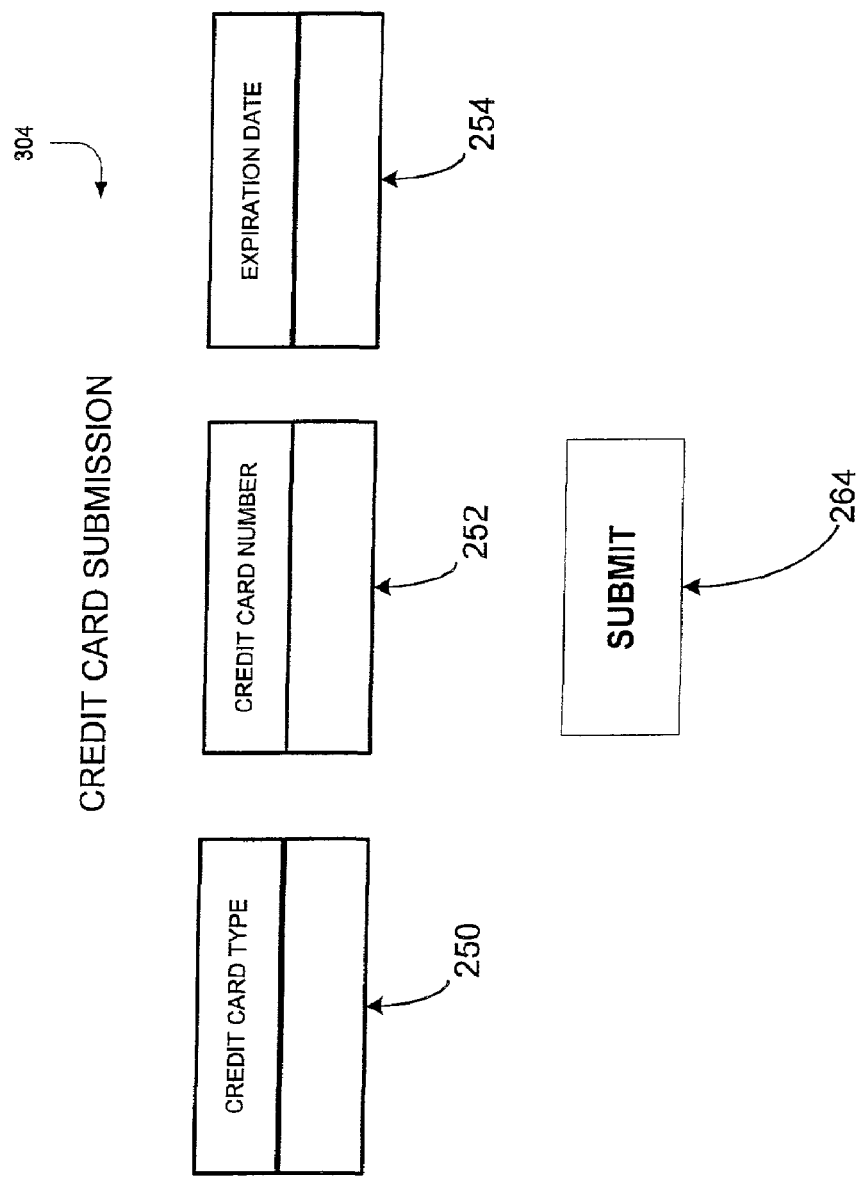

270

```
<html>
    <form id="get_card_info" method="post" action="http://payment.asp">
        <select name="card_type" onClick="talk(g_card_types)">
            <option value="amex">American Express</option>
            <option value="visa">Visa</option>
            <option value="ms">MasterCard</option>
        </select>
        <reco id="g_card_types" onReco ="handle() " >
            < grammar   src=". /gram#card_types" />
        </reco>
        <input type="text" name="card_num" width="30"
            onClick="talk(g_card_num)" />
        <reco id=" g_card_num " onReco ="handle() " >
            < grammar   src=" ./gram#digits " />
        </reco>
        <input type="text" name="expiry_date"
            onClick="talk(g_expiry_date)" />
        <reco id="g_expiry_date " >
            < grammar   src ="   ./gram#dates " />
        </reco>
        <input type="submit" value="Submit" onClick="verify()" />
    </form>
    <script><![CDATA[
            function talk(gobj) {
                gobj.activate();
            }
            function handle() {
                if (get_card_info.card_num != null)  {
                    if (get_card_info.card_type.value == "amex") {
                        if (get_card_info.card_num.length != 15)
                            alert ("amex should have 15 digits");
                    } else
                        if (get_card_info.card_num.length != 16)
                            alert ("visa and master should have 16 digits");
                }
            }
            function verify() {
                var flag = window.confirm("submit the credit card info?");
                if (flag) {
                    get_card_info.submit();
                }
            }
    ]]>
    </script>
</html>
```

280 — select/reco g_card_types (290)
282 — card_num input/reco
284 — expiry_date input/reco
272 — script block

FIG. 6

WEB SERVER CONTROLS FOR WEB ENABLED RECOGNITION AND/OR AUDIBLE PROMPTING

BACKGROUND OF THE INVENTION

The present invention relates to access of information over a network such as the Internet. More particularly, the present invention relates to controls for a server that generates client side markup enabled with recognition and/or audible prompting.

Small computing devices such as personal digital assistants (PDA), devices and portable phones are used with ever increasing frequency by people in their day-to-day activities. With the increase in processing power now available for microprocessors used to run these devices, the functionality of these devices is increasing, and in some cases, merging. For instance, many portable phones now can be used to access and browse the Internet as well as can be used to store personal information such as addresses, phone numbers and the like.

In view that these computing devices are being used for browsing the Internet, or are used in other server/client architectures, it is therefore necessary to enter information into the computing device. Unfortunately, due to the desire to keep these devices as small as possible in order that they are easily carried, conventional keyboards having all the letters of the alphabet as isolated buttons are usually not possible due to the limited surface area available on the housings of the computing devices.

To address this problem, there has been increased interest and adoption of using voice or speech to access information over a wide area network such as the Internet. For example, voice portals such as through the use of VoiceXML (voice extensible markup language) have been advanced to allow Internet content to be accessed using only a telephone. In this architecture, a document server (for example, a web server) processes requests from a client through a VoiceXML interpreter. The web server can produce VoiceXML documents in reply, which are processed by the VoiceXML interpreter and rendered audibly to the user. Using voice commands through voice recognition, the user can navigate the web.

Generally, there are two techniques of "speech enabling" information or web content. In the first technique, existing visual markup language pages typically visually rendered by a device having a display are interpreted and rendered aurally. However, this approach often yields poor results because markup meant for visual interaction usually do not have enough information to create a sensible aural dialog automatically. In addition, voice interaction is prone to error, especially over noisy channels such as a telephone. Without visual or other forms of persistent feedback, navigation through the web server application can be extremely difficult for the user. This approach thus requires mechanisms such as help messages, which are also rendered audibly to the user in order to help them navigate through the website. The mechanisms are commonly referred to as "voice dialogs", which also must address errors when incorrect information or no information is provided by the user, for example, in response to an audible question. Since the mechanisms are not commonly based on the visual content of the web page, they cannot be generated automatically, and therefore typically require extensive development time by the application developer.

A second approach to speech enabling web content includes writing specific voice pages in a new language. An advantage of this approach is that the speech-enabled page contains all the mechanisms needed for aural dialog such as repairs and navigational help. However, a significant disadvantage is that the application pages must then be adapted to include the application logic as found in the visual content pages. In other words, the application logic of the visual content pages must be rewritten in the form of the speech-enabling language. Even when this process can be automated by the use of tools creating visual and aural pages from the same specification, maintenance of the visual and speech enabled pages is usually difficult to synchronize. In addition, this approach does not easily allow multimodal applications, for example where both visual and speech interaction is provided on the web page. Since the visual and speech-enabled pages are unrelated, the input and output logic is not easily coordinated to work with each other.

To date, speech interaction authoring is also cumbersome due to the organization or format currently used as the interface. Generally, the speech interface either tends to be tied too closely to the business logic of the application, which inhibits re-use of the elements of the speech interface in other applications, or the speech interface is too restricted by a simplistic dialog model (e.g. forms and fields).

There is thus an ongoing need to improve upon the architecture and methods used to provide speech recognition in a server/client architecture such as the Internet. In particular, a method, system or authoring tool that addresses one, several or all of the foregoing disadvantages and thus provides generation of speech-enabled recognition and/or speech-enabled prompting of client markup from a web server is needed.

SUMMARY OF THE INVENTION

Web server controls are provided for generating client side markups with recognition and/or audible prompting. Three approaches are disclosed for implementation of the controls.

In a first approach, controls commonly related to visual rendering are extended to include an attributes related to recognition and/or audible prompting. Typically, controls such as "label" use a library having markup information, which provides a visual prompt on a display. Similarly, "text-box" provides an input field on a visual display. In the first approach, an additional library is provided for recognition and/or audibly prompting, wherein the controls include attributes or parameters to use both libraries.

In a second approach, the controls access the current, existing library for visual markup information, but include attributes and mechanisms to perform recognition and/or audible prompting. In other words, the controls use the library, but only when visual rendering is desired.

In a third approach, a set of companion controls having attributes related to recognition and/or audible prompting are formed. The companion controls use a library having recognition and audibly prompting markup information. The companion controls are selectively associated with visual controls. In this manner, application logic remains with the visual controls, wherein the companion controls provide recognized results to the visual controls. The companion controls follow a dialog in that controls are provided for prompting a question, obtaining an answer, confirming a result, providing a command, or making a statement. A question/answer control can also be formed from one or more of these controls in order to form a dialog or sub-dialog pertaining to a specific topic.

BRIEF DESCRIPTION OF THE DRAWINGS

FIG. 5 is a display for obtaining credit card information.

FIG. 6 is an exemplary page of markup language executable on a client having a display and voice recognition capabilities.

DETAILED DESCRIPTION OF THE ILLUSTRATIVE EMBODIMENTS

Figure 1:
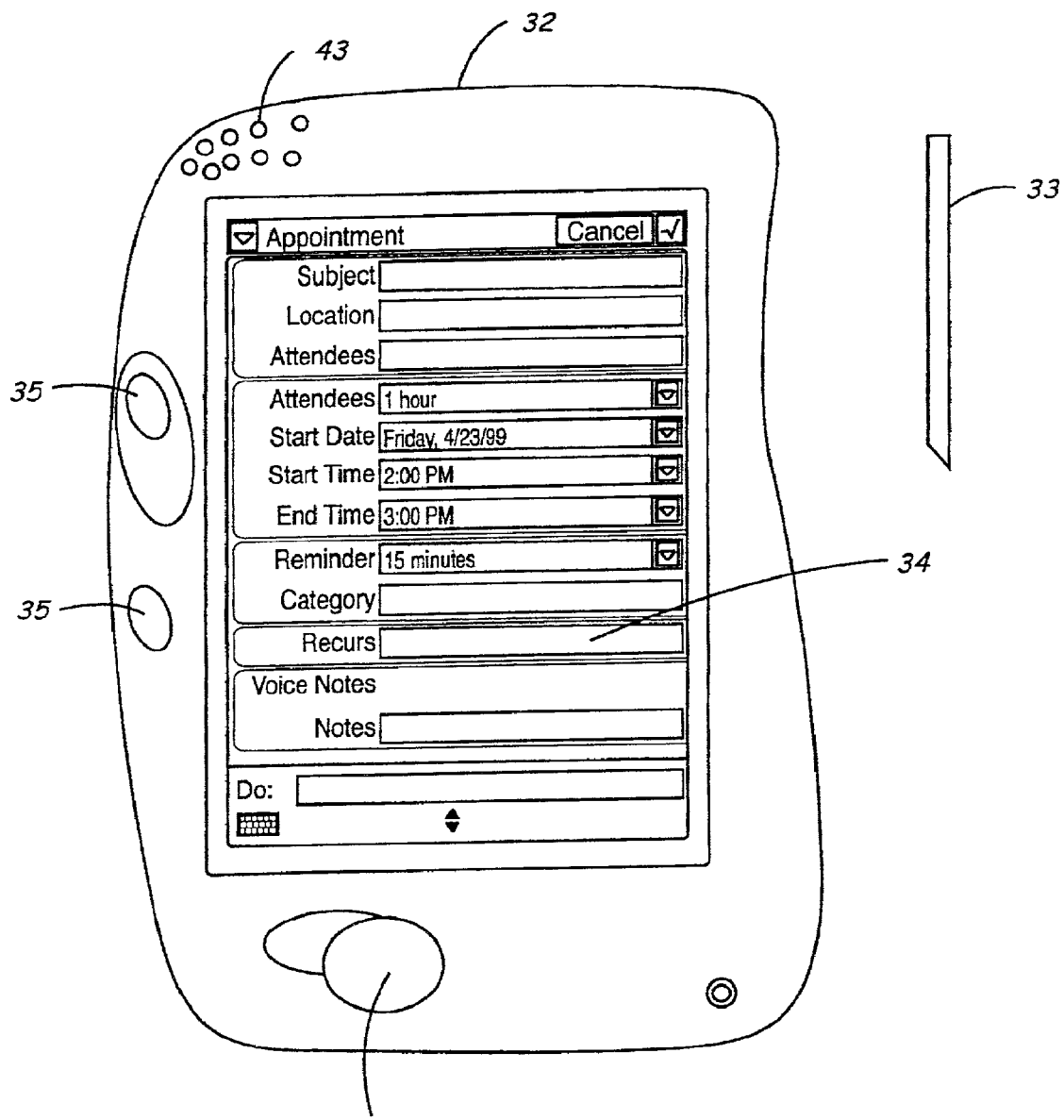
FIG. 1 is a plan view of a first embodiment of a computing device operating environment.

Before describing architecture of web based recognition and methods for implementing the same, it may be useful to describe generally computing devices that can function in the architecture. Referring now to FIG. 1, an exemplary form of a data management device (PIM, PDA or the like) is illustrated at 30. However, it is contemplated that the present invention can also be practiced using other computing devices discussed below, and in particular, those computing devices having limited surface areas for input buttons or the like. For example, phones and/or data management devices will also benefit from the present invention. Such devices will have an enhanced utility compared to existing portable personal information management devices and other portable electronic devices, and the functions and compact size of such devices will more likely encourage the user to carry the device at all times. Accordingly, it is not intended that the scope of the architecture herein described be limited by the disclosure of an exemplary data management or PIM device, phone or computer herein illustrated.

An exemplary form of a data management mobile device 30 is illustrated in FIG. 1. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 2:
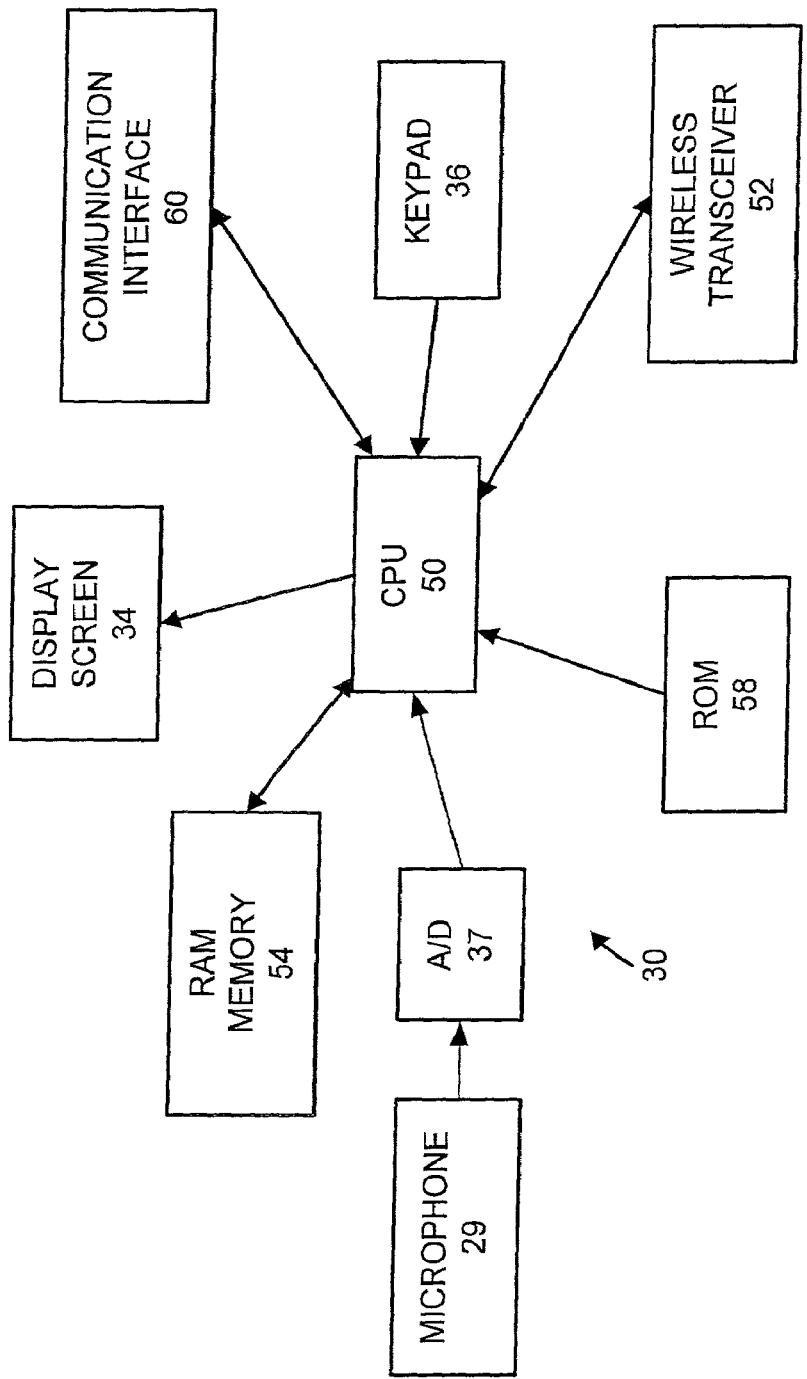
FIG. 2 is a block diagram of the computing device of FIG. 1.

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, and analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results. Using wireless transceiver 52 or communication interface 60, speech data is transmitted to a remote recognition server 204 discussed below and illustrated in the architecture of FIG. 5. Recognition results are then returned to mobile device 30 for rendering (e.g. visual and/or audible) thereon, and eventual transmission to a web server 202 (FIG. 5), wherein the web server 202 and mobile device 30 operate in a client/server relationship. Similar processing can be used for other forms of input. For example, handwriting input can be digitized with or without pre-processing on device 30. Like the speech data, this form of input can be transmitted to the recognition server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

In addition to the portable or mobile computing devices described above, it should also be understood that the present invention can be used with numerous other computing devices such as a general desktop computer. For instance, the present invention will allow a user with limited physical abilities to input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, wireless or cellular telephones, regular telephones (without any screen), personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Figure 3:
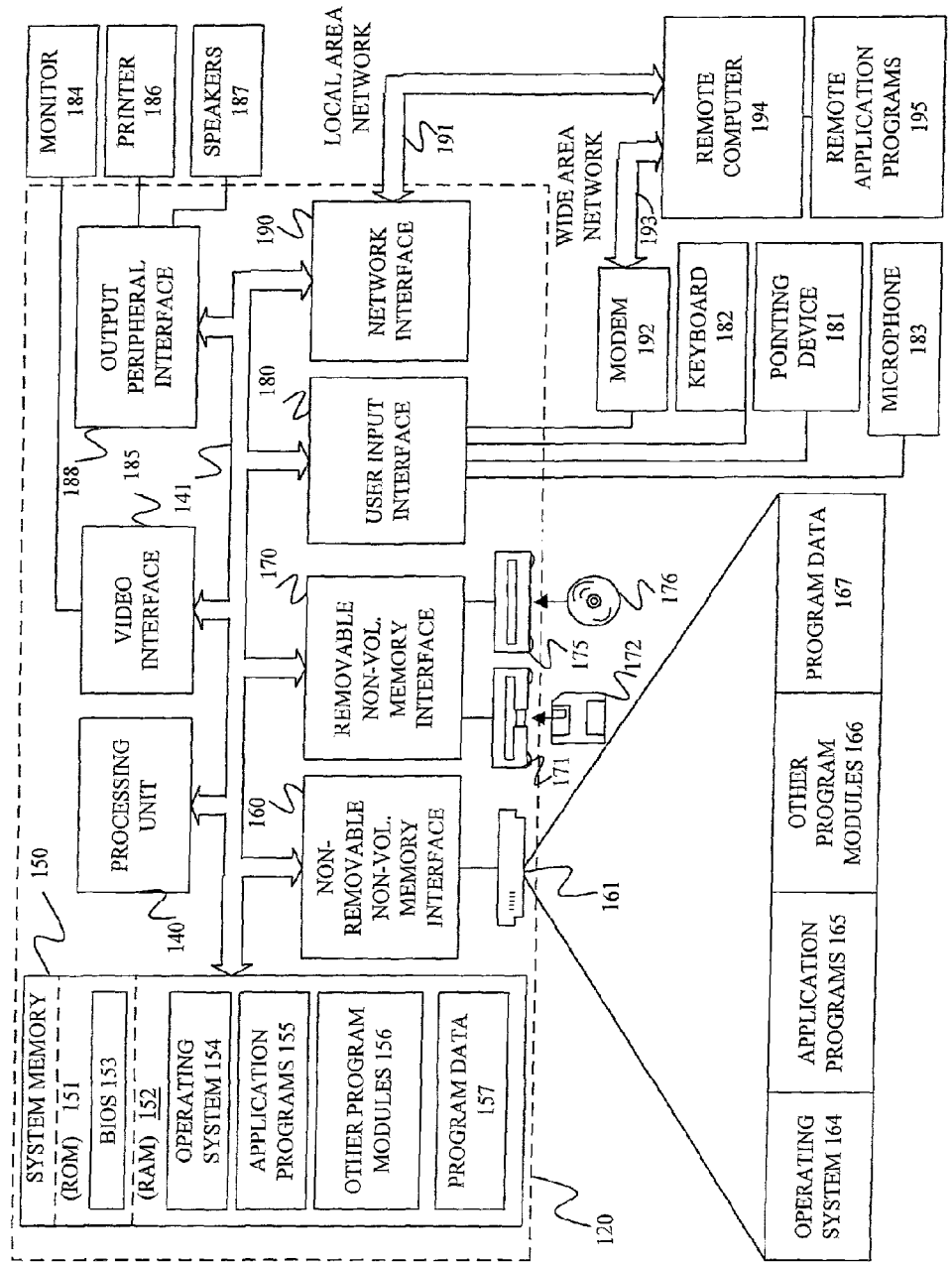
FIG. 3 is a block diagram of a general purpose computer.

The following is a brief description of a general purpose computer 120 illustrated in FIG. 3. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 3, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 3 illustrates operating system 54, application programs 155, other program modules 156, and program data 157.

The computer 120 may also include other removable/non-removable volatile/nonvolatile computer storage media. By way of example only, FIG. 3 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 3, provide storage of computer readable instructions, data structures, program modules and other data for the computer 120. In FIG. 3, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 3 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 3 illustrates remote application programs 195 as residing on remote computer 194. It will be appreciated that the network connections shown are exemplary and other means of establishing a communications link between the computers may be used.

Exemplary Architecture

Figure 4:
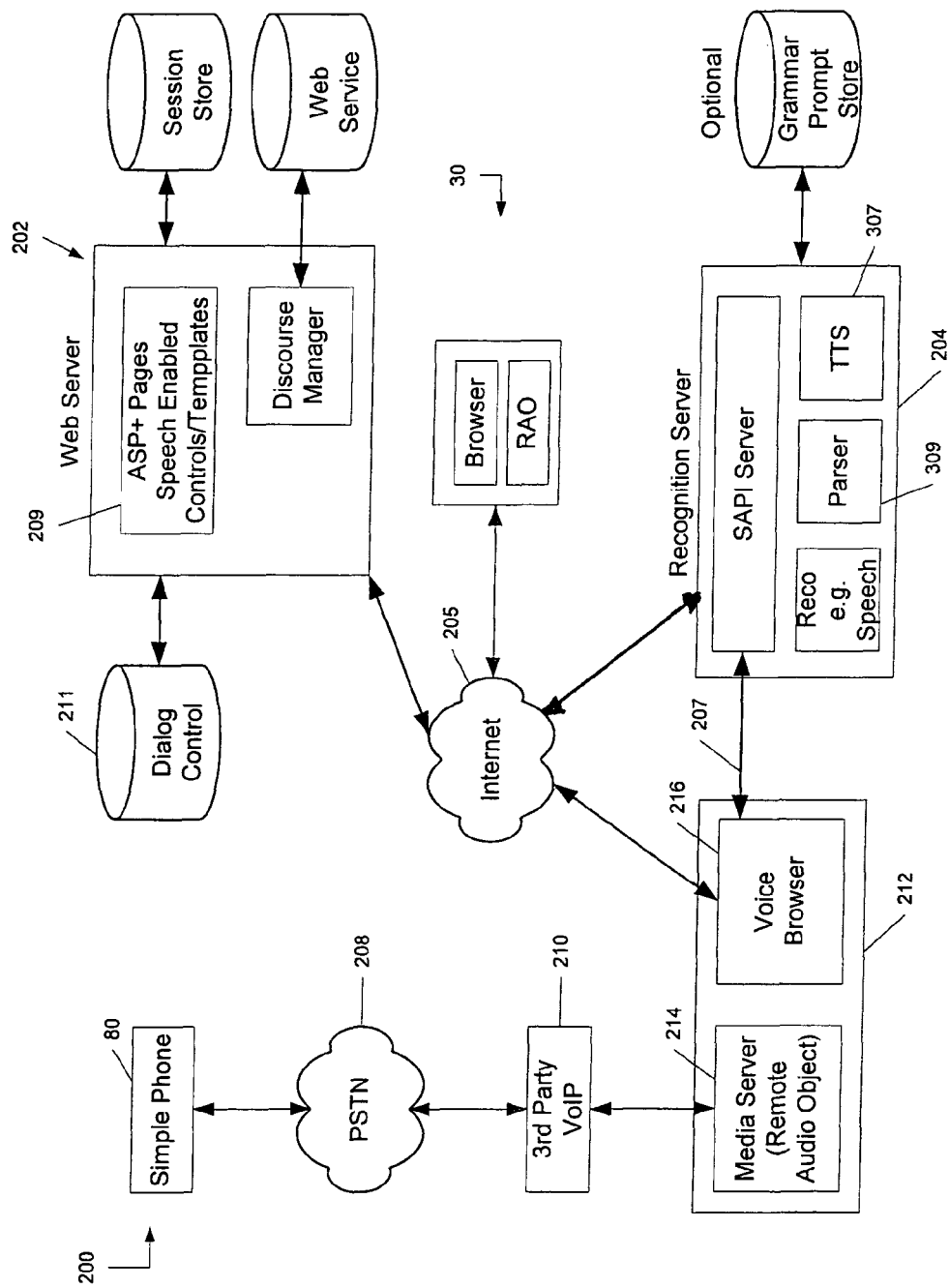
FIG. 4 is a block diagram of an architecture for a client/server system.

FIG. 4 illustrates architecture 200 for web based recognition as can be used with the present invention. Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

In this exemplary embodiment, Architecture 200 is unified in that whether information is obtained through device 30 or phone 80 using speech recognition, a single recognition server 204 can support either mode of operation. In addition, architecture 200 operates using an extension of well-known markup languages (e.g. HTML, XHTML, cHTML, XML, WML, and the like). Thus, information stored on web server 202 can also be accessed using well-known GUI methods found in these markup languages. By using an extension of well-known markup languages, authoring on the web server 202 is easier, and legacy applications currently existing can be also easily modified to include voice or other forms or recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to recognition server 204 with an indication of a grammar or language model to use during speech recognition. The implementation of the recognition server 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 4, device 30, web server 202 and recognition server 204 are commonly connected, and separately addressable, through a network 205, herein a wide area network such as the Internet. It therefore is not necessary that any of these devices be physically located adjacent to each other. In particular, it is not necessary that web server 202 includes recognition server 204. In this manner, authoring at web server 202 can be focused on the application to which it is intended without the authors needing to know the intricacies of recognition server 204. Rather, recognition server 204 can be independently designed and connected to the network 205, and thereby, be updated and improved without further changes required at web server 202. As discussed below, web server 202 can also include an authoring mechanism that can dynamically generate client-side markups and scripts. In a further embodiment, the web server 202, recognition server 204 and client 30 may be combined depending on the capabilities of the implementing machines. For instance, if the client comprises a general purpose computer, e.g. a personal computer, the client may include the recognition server 204. Likewise, if desired, the web server 202 and recognition server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. In one embodiment, the HTML scripts are of the form similar to HTML scripts provided to device 30. In this manner, web server 202 need not support device 30 and phone 80 separately, or even support standard GUI clients separately. Rather, a common markup language can be used. In addition, like device 30, voice recognition from audible signals transmitted by phone 80 are provided from voice browser 216 to recognition server 204, either through the network 205, or through a dedicated line 207, for example, using TCP/IP. Web server 202, recognition server 204 and telephone voice browser 212 can be embodied in any suitable computing environment such as the general purpose desktop computer illustrated in FIG. 3.

However, it should be noted that if DTMF recognition is employed, this form of recognition would generally be performed at the media server 214, rather than at the recognition server 204. In other words, the DTMF grammar would be used by the media server 214.

Referring back to FIG. 4, web server 202 can include a server side plug-in authoring tool or module 209 (e.g. ASP, ASP+, ASP.Net by Microsoft Corporation, JSP, Javabeans, or the like). Server side plug-in module 209 can dynamically generate client-side markups and even a specific form of markup for the type of client accessing the web server 202. The client information can be provided to the web server 202 upon initial establishment of the client/server relationship, or the web server 202 can include modules or routines to detect the capabilities of the client device. In this manner, server side plug-in module 209 can generate a client side markup for each of the voice recognition scenarios, i.e. voice only through phone 80 or multimodal for device 30. By using a consistent client side model, application authoring for many different clients is significantly easier.

In addition to dynamically generating client side markups, high-level dialog modules, discussed below, can be implemented as a server-side control stored in store 211 for use by developers in application authoring. In general, the high-level dialog modules 211 would generate dynamically client-side markup and script in both voice-only and multimodal scenarios based on parameters specified by developers. The high-level dialog modules 211 can include parameters to generate client-side markups to fit the developers' needs.

Exemplary Client Side Extensions

Before describing dynamic generation of client-side markups to which the present invention is directed, it may be helpful to first discuss an exemplary form of extensions to the markup language for use in web based recognition.

As indicated above, the markup languages such as HTML, XHTML cHTML, XML, WML or any other SGML-derived markup, which are used for interaction between the web server 202 and the client device 30, are extended to include controls and/or objects that provide recognition in a client/server architecture. Generally, controls and/or objects can include one or more of the following functions: recognizer controls and/or objects for recognizer configuration, recognizer execution and/or post-processing; synthesizer controls and/or objects for synthesizer configuration and prompt playing; grammar controls and/or objects for specifying input grammar resources; and/or binding controls and/or objects for processing recognition results. The extensions are designed to be a lightweight markup layer, which adds the power of an audible, visual, handwriting, etc. interface to existing markup languages. As such, the extensions can remain independent of: the high-level page in which they are contained, e.g. HTML; the low-level formats which the extensions used to refer to linguistic resources, e.g. the text-to-speech and grammar formats; and the individual properties of the recognition and speech synthesis platforms used in the recognition server 204. Although speech recognition will be discussed below, it should be understood that the techniques, tags and server side controls described hereinafter can be similarly applied in handwriting recognition, gesture recognition and image recognition.

In the exemplary embodiment, the extensions (also commonly known as "tags") are a small set of XML elements, with associated attributes and DOM object properties, events and methods, which may be used in conjunction with a source markup document to apply a recognition and/or audible prompting interface, DTMF or call control to a source page. The extensions' formalities and semantics are independent of the nature of the source document, so the extensions can be used equally effectively within HTML, XHTML, cHTML, XML, WML, or with any other SGML-derived markup. The extensions follow the document object model wherein new functional objects or elements, which can be hierarchical, are provided. Each of the elements are discussed in detail in the Appendix, but generally the elements can include attributes, properties, methods, events and/or other "child" elements.

At this point, it should also be noted that the extensions may be interpreted in two different "modes" according to the capabilities of the device upon which the browser is being executed on. In a first mode, "object mode", the full capabilities are available. The programmatic manipulation of the extensions by an application is performed by whatever mechanisms are enabled by the browser on the device, e.g. a JScript interpreter in an XHTML browser, or a WMLScript interpreter in a WML browser. For this reason, only a small set of core properties and methods of the extensions need to be defined, and these manipulated by whatever programmatic mechanisms exist on the device or client side. The object mode provides eventing and scripting and can offer greater functionality to give the dialog author a much finer client-side control over speech interactions. As used herein, a browser that supports full event and scripting is called an "uplevel browser". This form of a browser will support all the attributes, properties, methods and events of the extensions. Uplevel browsers are commonly found on devices with greater processing capabilities.

The extensions can also be supported in a "declarative mode". As used herein, a browser operating in a declarative mode is called a "downlevel browser" and does not support full eventing and scripting capabilities. Rather, this form of browser will support the declarative aspects of a given extension (i.e. the core element and attributes), but not all the DOM (document object model) object properties, methods and events. This mode employs exclusively declarative syntax, and may further be used in conjunction with declarative multimedia synchronization and coordination mechanisms (synchronized markup language) such as SMIL (Synchronized Multimedia Integration Language) 2.0. Downlevel browsers will typically be found on devices with limited processing capabilities.

At this point though, a particular mode of entry should be discussed. In particular, use of speech recognition in conjunction with at least a display and, in a further embodiment, a pointing device as well which enables the coordination of multiple modes of input, e.g. to indicate the fields for data entry, is particularly useful. Specifically, in this mode of data entry, the user is generally able to coordinate the actions of the pointing device with the speech input, so for example the user is under control of when to select a field and provide corresponding information relevant to the field. For instance, a credit card submission graphical user interface (GUI) is illustrated in FIG. 5, a user could first decide to enter the credit card number in field 252 and then enter the type of credit card in field 250 followed by the expiration date in field 254. Likewise, the user could return back to field 252 and correct an errant entry, if desired. When combined with speech recognition, an easy and natural form of navigation is provided. As used herein, this form of entry using both a screen display allowing free form actions of the pointing device on the screen, e.g. the selection of fields and recognition is called "multimodal".

Referring to FIG. 6, a HTML markup language code is illustrated. The HTML code includes a body portion 270 and a script portion 272. Entry of information in each of the fields 250, 252 and 254 is controlled or executed by code portions 280, 282 and 284, respectively. Referring first to code portion 280, on selection of field 250, for example, by use of stylus 33 of device 30, the event "onclick" is initiated which calls or executes function "talk" in script portion 272. This action activates a grammar used for speech recognition that is associated with the type of data generally expected in field 250. This type of interaction, which involves more than one technique of input (e.g. voice and pen-click/roller) is referred as "multimodal".

Referring now back to the grammar, the grammar is a syntactic grammar such as but not limited to a context-free grammar, a N-grammar or a hybrid grammar. (Of course, DTMF grammars, handwriting grammars, gesture grammars and image grammars would be used when corresponding forms of recognition are employed. As used herein, a "grammar" includes information for performing recognition, and in a further embodiment, information corresponding to expected input to be entered, for example, in a specific field.) A control 290 (herein identified as "reco") includes various elements, two of which are illustrated, namely a grammar element "grammar" and a "bind" element. Generally, like the code downloaded to a client from web server 202, the grammars can originate at web server 202 and be downloaded to the client and/or forwarded to a remote server for speech processing. The grammars can then be stored locally thereon in a cache. Eventually, the grammars are provided to the recognition server 204 for use in recognition. The grammar element is used to specify grammars, either inline or referenced using an attribute.

Upon receipt of recognition results from recognition server 204 corresponding to the recognized speech, handwriting, gesture, image, etc., syntax of reco control 290 is provided to receive the corresponding results and associate it with the corresponding field, which can include rendering of the text therein on display 34. In the illustrated embodiment, upon completion of speech recognition with the result sent back to the client, it deactivates the reco object and associates the recognized text with the corresponding field. Portions 282 and 284 operate similarly wherein unique reco objects and grammars are called for each of the fields 252 and 254 and upon receipt of the recognized text is associated with each of the fields 252 and 254. With respect to receipt of the card number field 252, the function "handle" checks the length of the card number with respect to the card type.

Generation of Client Side Markups

As indicated above, server side plug-in module 209 outputs client side markups when a request has been made from the client device 30. In short, the server side plug-in module 209 allows the website, and thus, the application and services provided by the application to be defined or constructed. The instructions in the server side plug-in module 209 are made of a complied code. The code is run when a web request reaches the web server 202. The server side plug-in module 209 then outputs a new client side markup page that is sent to the client device 30. As is well known, this process is commonly referred to as rendering. The server side plug-in module 209 operates on "controls" that abstract and encapsulate the markup language, and thus, the code of the client side markup page. Such controls that abstract and encapsulate the markup language and operate on the webserver 202 include or are equivalent to "Servlets" or "Server-side plug ins" to name a few.

As is known, server side plug-in modules of the prior art can generate client side markup for visual rendering and interaction with the client device 30. Three different approaches are provided herein for extending the server side plug-in module 209 to include recognition and audible prompting extensions such as the exemplary client side extensions discussed above. In a first approach illustrated schematically in FIG. 7, the current, visual, server side controls (which include parameters for visual display such as location for rendering, font, foreground color, background color, etc.) are extended to include parameters or attributes for recognition and audibly prompting for related recognition. Using speech recognition and associated audible prompting by way of example, the attributes generally pertain to audible prompting parameters such as whether the prompt comprises inline text for text-to-speech conversion, playing of a prerecorded audio file (e.g. a wave file), the location of the data (text for text-to-speech conversion or a prerecorded audio file) for audible rendering, etc. For recognition, the parameters or attributes can include the location of the grammar to be used during recognition, confidence level thresholds, etc. Since the server side plug-in module 209 generates client side markup, the parameters and attributes for the controls for the server side plug-in module 209 relate to the extensions provided in the client side markup for recognition and/or audible prompting.

Figure 7:
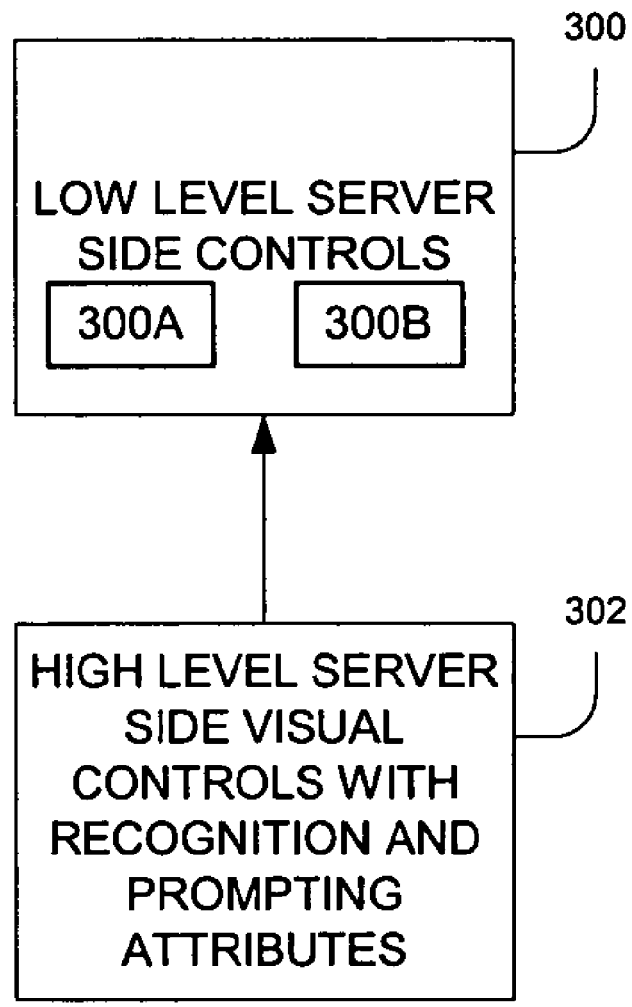
FIG. 7 is a block diagram illustrating a first approach for providing recognition and audible prompting in client side markups.

The controls indicated at 300 in FIG. 7 are controls, which are well-known in website application development or authoring tools such as ASP, ASP+, ASP.Net, JSP, Javabeans, or the like. Such controls are commonly formed in a library and used by controls 302 to perform a particular visual task. Library 300A includes methods for generating the desired client markup, event handlers, etc. Examples of visual controls 302 include a "Label" control that provides a selected text label on a visual display such as the label "Credit Card Submission" 304 in FIG. 5. Another example of a higher level visual control 302 is a "Textbox", which allows data to be entered in a data field such as is indicated at 250 in FIG. 5. The existing visual controls 302 are also well-known. In the first approach for extending server side plug-in module controls to include recognition and/or audible prompting, each of the visual controls 302 would include further parameters or attributes related to recognition or audible prompting. In the case of the "label" control, which otherwise provides selected text on a visual display, further attributes may include whether an audio data file will be rendered or text-to-speech conversion will be employed as well as the location of this data file. A library 300B, similar to library 300A, includes further markup information for performing recognition and/or audible prompting. Each of the visual controls 302 is coded so as to provide this information to the controls 300B as appropriate to perform the particular task related to recognition or audible prompting.

As another example, the "Textbox" control, which generates an input field on a visual display and allows the user of the client device 30 to enter information, would also include appropriate recognition or audible prompting parameters or attributes such as the grammar to be used for recognition. It should be noted that the recognition or audible prompting parameters are optional and need not be used if recognition or audible prompting is not otherwise desired.

In general, if a control at level 302 includes parameters that pertain to visual aspects, the control will access and use the library 300A. Likewise, if the control includes parameters pertaining to recognition and/or audible prompting the control will access or use the library 300B. It should be noted that libraries 300A and 300B have been illustrated separately in order to emphasize the additional information present in library 300B and that a single library having the information of libraries 300A and 300B can be implemented.

In this approach, each of the current or prior art visual controls 302 are extended to include appropriate recognition/audible prompting attributes. The controls 302 can be formed in a library. The server side plug-in module 209 accesses the library for markup information. Execution of the controls generates a client side markup page, or a portion thereof, with the provided parameters.

Figure 8:
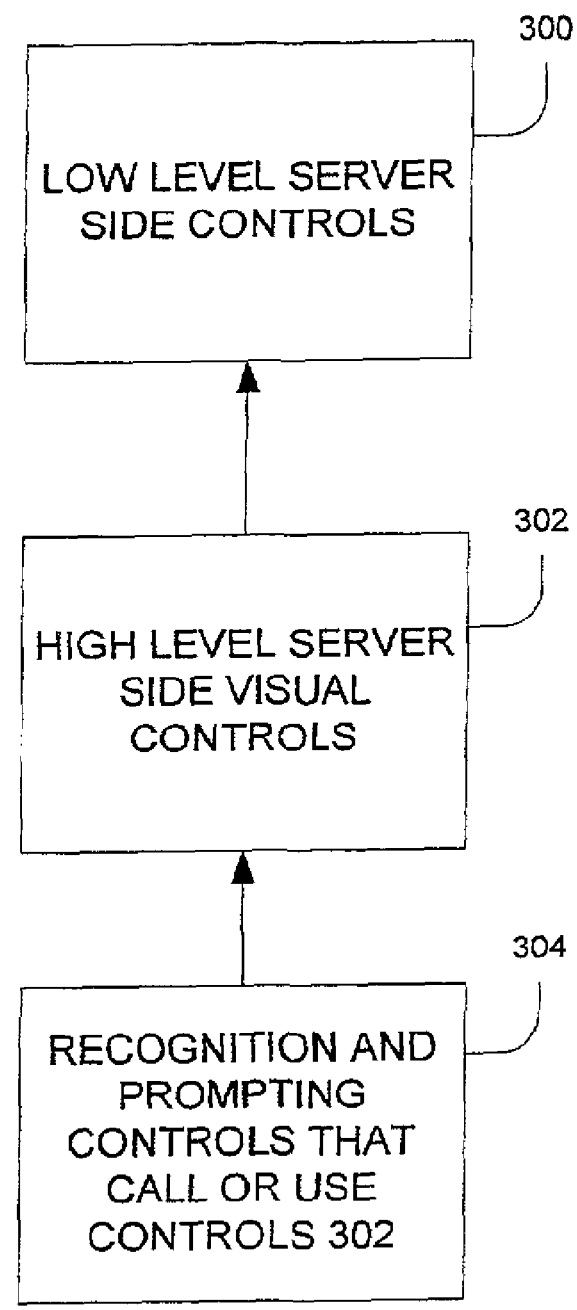
FIG. 8 is a block diagram illustrating a second approach for providing recognition and audible prompting in client side markups.

In a second approach illustrated in FIG. 8, new visual, recognition/audible prompting controls 304 are provided such that the controls 304 are a subclass relative to visual controls 302, wherein recognition/audible prompting functionality or markup information is provided at controls 304. In other words, a new set of controls 304 are provided for recognition/audible prompting and include appropriate parameters or attributes to perform the desired recognition or an audible prompting related to a recognition task on the client device 30. The controls 304 use the existing visual controls 302 to the extent that visual information is rendered or obtained through a display. For instance, a control "SpeechLabel" at level 304 uses the "Label" control at level 302 to provide an audible rendering and/or visual text rendering. Likewise, a "SpeechTextbox" control would associate a grammar and related recognition resources and processing with an input field. Like the first approach, the attributes for controls 304 include where the grammar is located for recognition, the inline text for text-to-speech conversion, or the location of a prerecorded audio data file that will be rendered directly or a text file through text-to-speech conversion. The second approach is advantageous in that interactions of the recognition controls 304 with the visual controls 302 are through parameters or attributes, and thus, changes in the visual controls 302 may not require any changes in the recognition controls 304 provided the parameters or attributes interfacing between the controls 304 and 302 are still appropriate. However, with the creation of further visual controls 302, a corresponding recognition/audible prompting control at level 304 may also have to be written.

Figure 9:
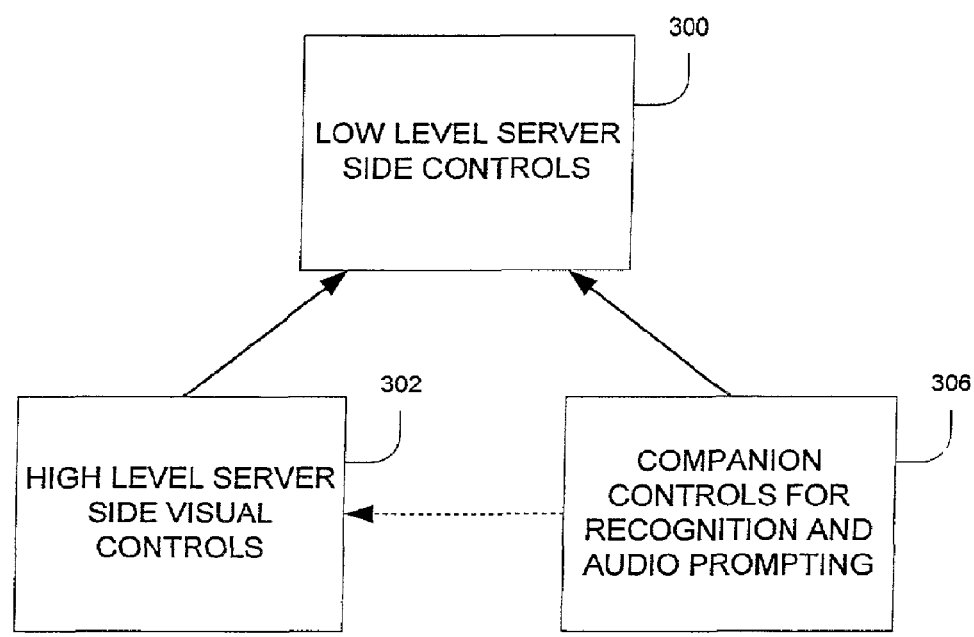
FIG. 9 is a block diagram illustrating a third approach for providing recognition and audible prompting in client side markups.

A third approach is illustrated in FIG. 9. Generally, controls 306 of the third approach are separate from the visual controls 302, but are associated selectively therewith as discussed below. In this manner, the controls 306 do not directly build upon the visual controls 302, but rather provide recognition/audible prompting enablement without having to rewrite the visual controls 302. The controls 306, like the controls 302, use a library 300. In this embodiment, library 300 includes both visual and recognition/audible prompting markup information and as such is a combination of libraries 300A and 300B of FIG. 7.

There are significant advantages to this third approach. Firstly, the visual controls 302 do not need to be changed in content. Secondly, the controls 306 can form a single module which is consistent and does not need to change according to the nature of the speech-enabled control 302. Thirdly, the process of speech enablement, that is, the explicit association of the controls 306 with the visual controls 302 is fully under the developer's control at design time, since it is an explicit and selective process. This also makes it possible for the markup language of the visual controls to receive input values from multiple sources such as through recognition provided by the markup language generated by controls 306, or through a conventional input device such as a keyboard. In short, the controls 306 can be added to an existing application authoring page of a visual authoring page of the server side plug-in module 209. The controls 306 provide a new modality of interaction (i.e. recognition and/or audible prompting) for the user of the client device 30, while reusing the visual controls' application logic and visual input/output capabilities. In view that the controls 306 can be associated with the visual controls 302 whereat the application logic can be coded, controls 306 may be hereinafter referred to as "companion controls 306" and the visual controls 302 be referred to as "primary controls 302". It should be noted that these references are provided for purposes of distinguishing controls 302 and 306 and are not intended to be limiting. For instance, the companion controls 306 could be used to develop or author a website that does not include visual renderings such as a voice-only website. In such a case, certain application logic could be embodied in the companion control logic.

Figure 10:
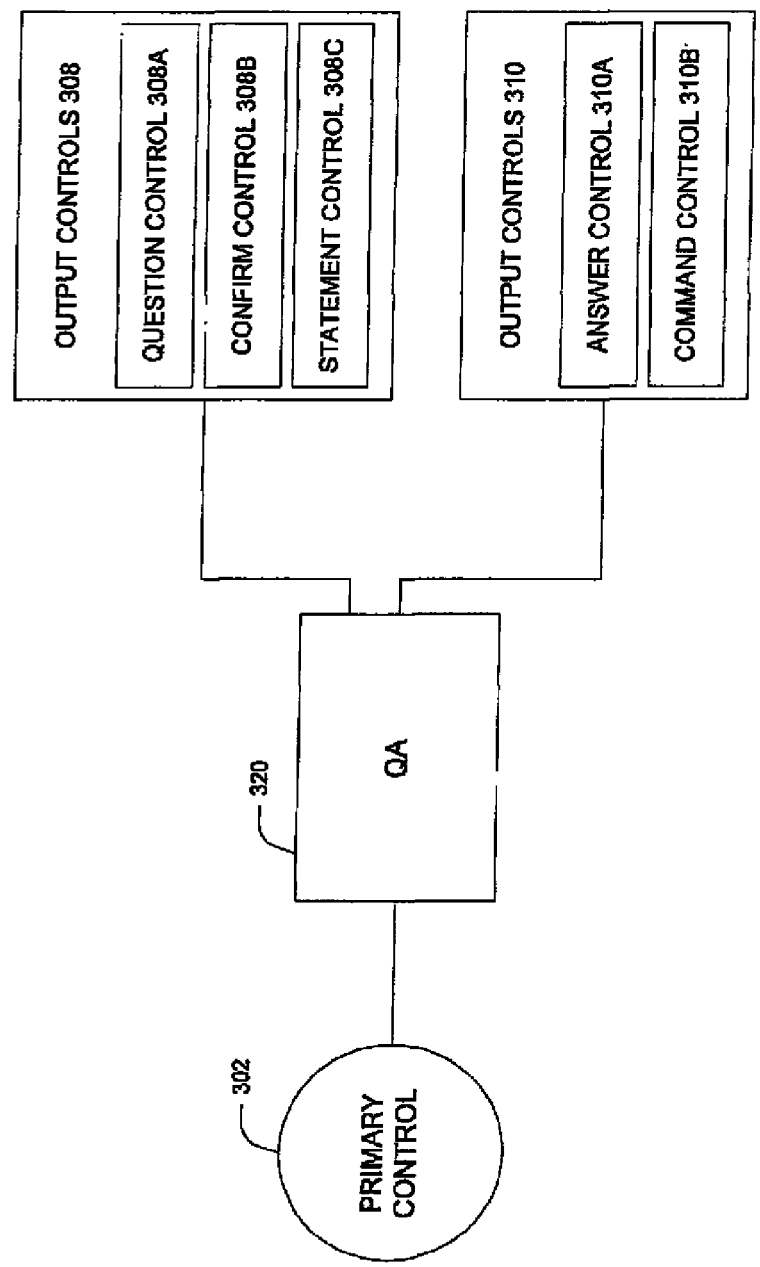
FIG. 10 is a block diagram illustrating companion controls.

An exemplary set of companion controls 306 are further illustrated in FIG. 10. The set of companion controls 306 can be grouped as output controls 308 and input controls 310.

Output controls 308 provide "prompting" client side markups, which typically involves the playing of a prerecorded audio file, or text for text-to-speech conversion, the data included in the markup directly or referenced via a URL. Although a single output control can be defined with parameters to handle all audible prompting, and thus should be considered as a further aspect of the present invention, in the exemplary embodiment, the forms or types of audible prompting in a human dialog are formed as separate controls. In particular, the output controls 308 can include a "Question" control 308A, a "Confirmation" control 308B and a "Statement" control 308C, which will be discussed in detail below. Likewise, the input controls 310 can also form or follow human dialog and include a "Answer" control 310A and a "Command" control 310B. The input controls 310 are discussed below, but generally the input controls 310 associate a grammar with expected or possible input from the user of the client device 30.

Although the question control 308A, confirmation control 308B, statement control 308C, answer control 310A, command control 310B, other controls as well as the general structure of these controls, the parameters and event handlers, are specifically discussed with respect to use as companion controls 306, it should be understood that these controls, the general structure, parameters and event handlers can be adapted to provide recognition and/or audible prompting in the other two approaches discussed above with respect to FIGS. 7 and 8. For instance, the parameter "ClientToSpeechEnable", which comprises one exemplary mechanism to form the association between a companion control and a visual control, would not be needed when embodied in the approaches of FIGS. 7 and 8.

In a multimodal application, at least one of the output controls 308 or one of the input controls 310 is associated with a primary or visual control 302. In the embodiment illustrated, the output controls 308 and input controls 310 are arranged or organized under a "Question/Answer" (hereinafter also "QA") control 320. QA control 320 is executed on the web server 202, which means it is defined on the application development web page held on the web server using the server-side markup formalism (ASP, JSP or the like), but is output as a different form of markup to the client device 30. Although illustrated in FIG. 10 where the QA control appears to be formed of all of the output controls 308 and the input controls 310, it should be understood that these are merely options wherein one or more may be included for a QA control.

Figure 11:
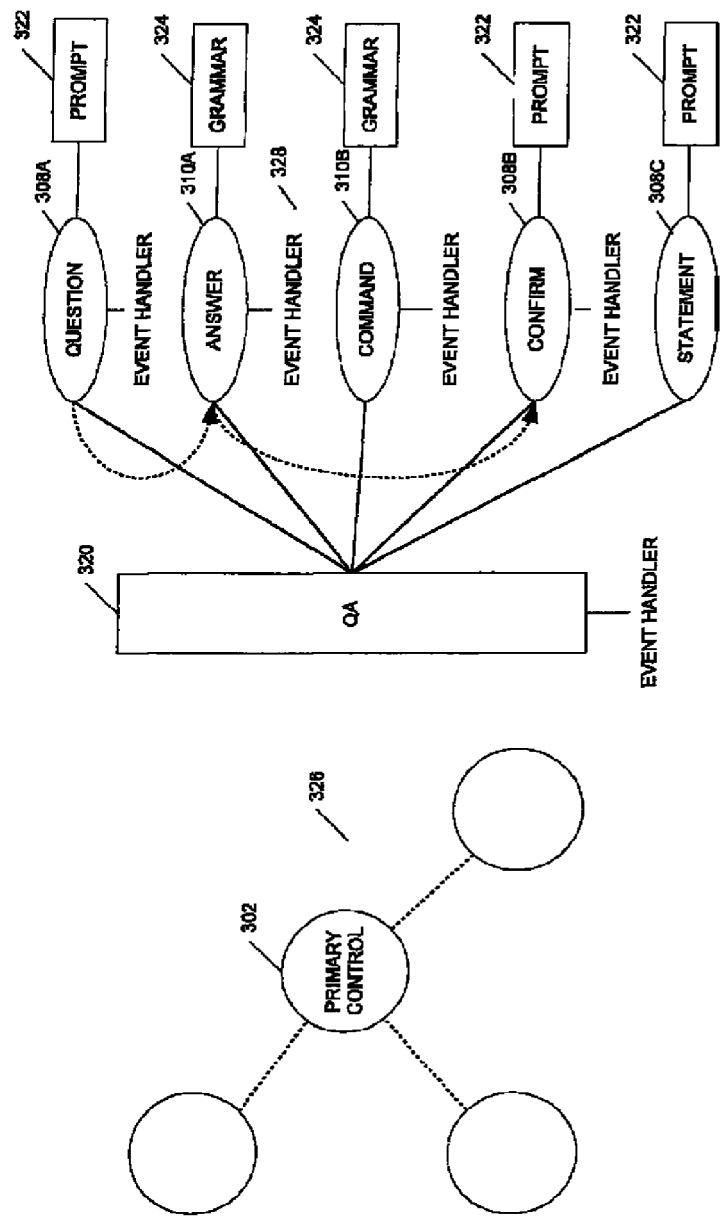
FIG. 11 is a detailed block diagram illustrating companion controls.

At this point it may be helpful to explain use of the controls 308 and 310 in terms of application scenarios. Referring to FIG. 11 and in a voice-only application QA control 320 could comprise a single question control 308A and an answer control 310A. The question control 308A contains one or more prompt objects or controls 322, while the answer control 310A can define a grammar through grammar object or control 324 for recognition of the input data and related processing on that input. Line 326 represents the association of the QA control 320 with the corresponding primary control 302, if used. In a multimodal scenario, where the user of the client device 30 may touch on the visual textbox, for example with a "TapEvent", an audible prompt may not be necessary. For example, for a primary control comprising a textbox having visual text forming an indication of what the user of client device should enter in the corresponding field, a corresponding QA control 320 may or may not have a corresponding prompt such as an audio playback or a text-to-speech conversion, but would have a grammar corresponding to the expected value for recognition, and event handlers 328 to process the input, or process other recognizer events such as no speech detected, speech not recognized, or events fired on timeouts (as illustrated in "Eventing" below).

In general, the QA control through the output controls 308 and input controls 310 and additional logic can perform one or more of the following: provide output audible prompting, collect input data, perform confidence validation of the input result, allow additional types of input such as "help" commands, or commands that allow the user of the client device to navigate to other selected areas of the website, allow confirmation of input data and control of dialog flow at the website, to name a few. In short, the QA control 320 contains all the controls related to a specific topic. In this manner, a dialog is created through use of the controls with respect to the topic in order to inform to obtain information, to confirm validity, or to repair a dialog or change the topic of conversation.

In one method of development, the application developer can define the visual layout of the application using the visual controls 302. The application developer can then define the spoken interface of the application using companion controls 306 (embodied as QA control 320, or output controls 308 and input control 310). As illustrated in FIGS. 10 and 11, each of the companion controls 306 are then linked or otherwise associated with the corresponding primary or visual control 302 to provide recognition and audible prompting. Of course if desired, the application developer can define or encode the application by switching between visual controls 302 and companion controls 306, forming the links therebetween, until the application is completely defined or encoded.

At this point, it may be helpful to provide a short description of each of the output controls 308 and input controls 310. Detailed descriptions are provided below in Appendix B.

Questions, Answers and Commands

Generally, as indicated above, the question controls 308A and answer controls 310A in a QA control 320 hold the prompt and grammar resources relevant to the primary control 302, and related binding (associating recognition results with input fields of the client-side markup page) and processing logic. The presence, or not, of question controls 308A and answer controls 310A determines whether speech output or recognition input is enabled on activation. Command controls 310B and user initiative answers are activated by specification of the Scope property on the answer controls 310A and command controls 310B.

In simple voice-only applications, a QA control 320 will typically hold one question control or object 308A and one answer control or object 310A. Although not shown in the example below, command controls 310B may also be specified, e.g. Help, Repeat, Cancel, etc., to enable user input which does not directly relate to the answering of a particular question.

A typical 'regular' QA control for voice-only dialog is as follows:

```
<Speech:QA
    id="QA_WhichOne"
    ControlsToSpeechEnable="textBox1"
    runat="server" >
    <Question >
        <prompt>Which one do you want?
        </prompt>
    </Question>
    <Answer >
        <grammar src="whichOne.gram" />
    </Answer>
</Speech:QA>
```

(The examples provided herein are written in the ASP.Net framework by example only and should not be considered as limiting the present invention.)

In this example, the QA control can be identified by its "id", while the association of the QA control with the desired primary or visual control is obtained through the parameter "ControlsToSpeechEnable", which identifies one or more primary controls by their respective identifiers. If desired, other well-known techniques can be used to form the association. For instance, direct, implicit associations are available through the first and second approaches described above, or separate tables can be created used to maintain the associations. The parameter "runat" instructs the web server that this code should be executed at the webserver 202 to generate the correct markup.

A QA control might also hold only a statement control 308C, in which case it is a prompt-only control without active grammars (e.g. for a welcome prompt). Similarly a QA control might hold only an answer control 310A, in which case it may be a multimodal control, whose answer control 310A activates its grammars directly as the result of an event from the GUI, or a scoped mechanism (discussed below) for user initiative.

It should also be noted that a QA control 320 may also hold multiple output controls 308 and input controls 310 such as multiple question controls 308A and multiple answers controls 310A. This allows an author to describe interactional flow about the same entity within the same QA control. This is particularly useful for more complex voice-only dialogs. So a mini-dialog which may involve different kinds of question and answer (e.g. asking, confirming, giving help, etc.), can be specified within the wrapper of the QA control associated with the visual control which represents the dialog entity. A complex QA control is illustrated in FIG. 11.

The foregoing represent the main features of the QA control. Each feature is described from a functional perspective below.

Answer Control

The answer control 310A abstracts the notion of grammars, binding and other recognition processing into a single object or control. Answer controls 310A can be used to specify a set of possible grammars relevant to a question, along with binding declarations and relevant scripts. Answer controls for multimodal applications such as "Tap-and-Talk" are activated and deactivated by GUI browser events. The following example illustrates an answer control 310A used in a multimodal application to select a departure city on the "mouseDown" event of the textbox "txtDepCity", and write its value into the primary textbox control:

```
<Speech:QA
    controlsToSpeechEnable="txtDepCity"
    runat="server">
    <Answer    id="AnsDepCity"
        StartEvent="onMouseDown"
        StopEvent="onMouseUp"
        />
        <grammar src="/grammars/depCities.gram"/>
        <bind value="//sml/DepCity"
        targetElement="txtCity" />
    </Answer>
</Speech:QA>
```

Typical answer controls 310A in voice-only applications are activated directly by question controls 308A as described below.

The answer control further includes a mechanism to associate a received result with the primary controls. Herein, binding places the values in the primary controls; however, in another embodiment the association mechanism may allow the primary control to look at or otherwise access the recognized results.

Question Control

Question controls 308A abstracts the notion of the prompt tags (Appendix A) into an object which contains a selection of possible prompts and the answer controls 310A which are considered responses to the question. Each question control 308A is able to specify which answer control 310A it activates on its execution. This permits appropriate response grammars to be bundled into answer controls 310A, which reflect relevant question controls 308A.

The following question control 308A might be used in a voice-only application to ask for a Departure City:

```
<Speech:QA id="QADepCity"
    controlsToSpeechEnable="txtDepCity"
    runat="server" >
    <Question id="Q1" Answers="AnsDepCity" >
        <prompt>
            Please give me the departure
            city.
        </prompt>
    </Question>
    <Answer id="AnsDepCity" ... />
</Speech:QA>
```

In the example below, different prompts can be called depending on an internal condition of the question control 308A. The ability to specify conditional tests on the prompts inside a question control 308A means that changes in wording can be accommodated within the same functional unit of the question control 308A.

```
<Speech:QA     id="QADepCity"
    controlsToSpeechEnable="txtDepCity"
    runat="server" >
    <Question id="Q1" Answers="AnsDepCity" >
        <prompt count="1">
            Now I need to get the departure city.
            Where would you like to fly from?
        </prompt>
        <prompt count="2">
            Which departure city?
        </prompt>
    </Question>
    <Answer id="AnsDepCity" ... />
</Speech:QA>
```

Conditional QA Control

The following example illustrates how to determine whether or not to activate a QA control based upon information known to the application. The example is a portion of a survey application. The survey is gathering information from employees regarding the mode of transportation they use to get to work.

The portion of the survey first asks whether or not the user rides the bus to work. If the answer is:

Yes, the next question asks how many days last week the users rode the bus.

No, the "number of days rode the bus" question is bypassed.

```
<asp:Label id="lblDisplay1"
    text="Do you ride the bus to work?"
    runat="server"/>
<asp:DropDownList id="lstRodeBusYN" runat="server">
    <asp:ListItem
        selected="true">No</asp:ListItem>
    <asp:ListItem>Yes</asp:ListItem>
</asp:DropDownList>
<Speech:QA id="QA_RideBus
    ControlsToSpeechEnable="lstRodeBusYN"
    runat="server" >
    <SDN:Question id="Q_RideBus" >
        <prompt bargeIn="False">
        Do you ride the bus to work?
        </prompt >
    </SDN:Question>
    <SDN:Answer id="A_RideBus"
            autobind="False"
            StartEvent="onMouseDown"
            StopEvent="onMouseUp"
            runat="server"
        onClientReco="ProcessRideBusAnswer"
            <grammar src="..." /> <--! "yes/no"
            grammar -->
    </SDN:Answer>
</Speech:QA>
<asp:Label id="lblDisplay2"
        enabled="False"
        text="How many days last week did you ride
        the bus to work?"
        runat="server"/>
<asp:DropDownList id="lstDaysRodeBus" enabled="False"
runat="server">
        <asp:ListItem selected="true"
        >0</asp:ListItem>
        <asp:ListItem>1</asp:ListItem>
        <asp:ListItem>2</asp:ListItem>
        <asp:ListItem>3</asp:ListItem>
        <asp:ListItem>4</asp:ListItem>
        <asp:ListItem>5</asp:ListItem>
        <asp:ListItem>6</asp:ListItem>
        <asp:ListItem>7</asp:ListItem>
    </asp:DropDownList>
<Speech:QA id="QA_DaysRodeBus"
        ControlsToSpeechEnable="lstDaysRodeBus"
        ClientTest="RideBusCheck"
        runat="server" >
    <Question id="Q_DaysRodeBus" >
        <prompt bargeIn="False">
        How many days last week did you ride the
        bus to work?
        </prompt>
    </SDN:Question>
    <SDN:Answer id="A_DaysRodeBus"
            autobind="False"
            StartEvent="onMouseDown"
            StopEvent="onMouseUp"
            runat="server"
        onClientReco="ProcessDaysRodeBusAnswer"
            <grammar src="..." /> <--! "numbers"
            grammar -->
    </SDN:Answer>
</Speech:QA>
<script language="jscript">
    function ProcessRideBusAnswer( ) {
        <--! using SML attribute of the Event object,
        determine yes or no answer -->
        <--! then select the appropriate item in the
        dropdown listbox            -->
        <--! and enable the next label and dropdown
        listbox if answer is "yes"       -->
        if <--! Answer is "yes" --> {
            lstRodeBusYN.selectedIndex=2
            lblDisplay2.enabled="true"
            lstDaysRodeBus.enabled="true" }
    }
```

```
function RideBusCheck( ) {
        if lstRodeBusYN.selectedIndex="1" <--!
        this is no -->
                then return "False"
        endif
}
function ProcessDaysRodeBusAnswer( ) {
        <--! case statement to select proper
        dropdown item -->
}
</script>
```

In the example provided above, the QA control "QA_DaysRodeBus" is executed based on a boolean parameter "ClientTest", which in this example, is set based on the function RideBusCheck( ). If the function returns a false condition, the QA control is not activated, whereas if a true condition is returned the QA control is activated. The use of an activation mechanism allows increased flexibility and improved dialog flow in the client side markup page produced. As indicated in Appendix B many of the controls and objects include an activation mechanism.

Command Control

Command controls 310B are user utterances common in voice-only dialogs which typically have little semantic import in terms of the question asked, but rather seek assistance or effect navigation, e.g. help, cancel, repeat, etc. The Command control 310B within a QA control 306 can be used to specify not only the grammar and associated processing on recognition (rather like an answer control 310A without binding of the result to an input field), but also a 'scope' of context and a type. This allows for the authoring of both global and context-sensitive behavior on the client side markup.

As appreciated by those skilled in the art from the foregoing description, controls 306 can be organized in a tree structure similar to that used in visual controls 302. Since each of the controls 306 are also associated with selected visual controls 302, the organization of the controls 306 can be related to the structure of the controls 302.

The QA controls 302 may be used to speech-enable both atomic controls (textbox, label, etc.) and container controls (form, panel, etc.) This provides a way of scoping behaviour and of obtaining modularity of subdialog controls. For example, the scope will allow the user of the client device to navigate to other portions of the client side markup page without completing a dialog.

In one embodiment, "Scope" is determined as a node of the primary controls tree. The following is an example "help" command, scoped at the level of the "Pnl1" container control, which contains two textboxes.

```
<asp:panel id="Pnl1" ...>
        <asp:textbox id="tb1" ... />
        <asp:textbox id="tb2" ... />
</asp:panel>
<Speech:QA ... >
    <Command
        id="HelpCmd1"
        scope="Pnl1"
        type="help"
        onClientReco="GlobalGiveHelp( )" >
        <Grammar src="grammars/help.gram"/>
    </Command>
</Speech:QA>
<script>
        function GlobalGiveHelp( ) {
        ...
        }
</script>
```

As specified, the "help" grammar will be active in every QA control relating to "Pnl1" and its contents. The GlobalGiveHelp subroutine will execute every time "help" is recognized. To override this and achieve context-sensitive behavior, the same typed command can be scoped to the required level of context:

```
<Speech:QA ... >
    <Command
        id="HelpCmd2"
        scope="Tb2"
        type="help"
        onClientReco="SpecialGiveHelp( )" >
        <Grammar src="grammars/help.gram"/>
    </Command>
</Speech:QA>
<script>
        function SpecialGiveHelp( ) {
        ...
        }
</script>
```

Confirmation Control

The QA control 320 can also include a method for simplifying the authoring of common confirmation subdialogs. The following QA control exemplifies a typical subdialog which asks and then confirms a value:

```
<Speech:QA
    id="qaDepCity"
    controlsToSpeechEnable="txtDepCity"
    runat="server" >
    <!-- asking for a value -->
    <Question      id="AskDepCity"
            type="ask"
            Answers="AnsDepCity" >
        <prompt> Which city? </prompt>
    </Question>
    <Answer        id="AnsDepCity"
                    confirmThreshold="60" >
        <grammar src="grammars/depCity.gram"
        />
    </Answer >
    <!-- confirming the value -->
    <Confirm       id="ConfirmDepCity"
                    Answers="AnsConfDepCity" >
        <prompt>
            Did you say <value
            targetElement="txtDepCity/Text">?
        </prompt>
    </Confirm>
    <Answer        id="AnsConfDepCity" >
        <grammar
        src="grammars/YesNoDepCity.gram" />
    </Answer>
</Speech:QA>
```

In this example, a user response to 'which city?' which matches the AnsDepCity grammar but whose confidence level does not exceed the confirmThreshold value will trigger the confirm control 308. More flexible methods of confirmation available to the author include mechanisms using multiple question controls and multiple answer controls.

In a further embodiment, additional input controls related to the confirmation control include an accept control, a deny control and a correct control. Each of these controls could be activated (in a manner similar to the other controls) by the corresponding confirmation control and include grammars to accept, deny or correct results, respectively. For instance, users are likely to deny be saying "no", to accept by saying "yes" or "yes+current value" (e.g., "Do you want to go to Seattle?" "Yes, to Seattle"), to correct by saying "no"+new value (e.g., "Do you want to go to Seattle" "No, Pittsburgh").

Statement Control

The statement control allows the application developer to provide an output upon execution of the client side markup when a response is not required from the user of the client device 30. An example could be a "Welcome" prompt played at the beginning of execution of a client side markup page.

An attribute can be provided in the statement control to distinguish different types of information to be provided to the user of the client device. For instance, attributes can be provided to denote a warning message or a help message. These types could have different built-in properties such as different voices. If desired, different forms of statement controls can be provided, i.e. a help control, warning control, etc. Whether provided as separate controls or attributes of the statement control, the different types of statements have different roles in the dialog created, but share the fundamental role of providing information to the user of the client device without expecting an answer back.

Eventing

Event handlers as indicated in FIG. 11 are provided in the QA control 320, the output controls 308 and the input controls 310 for actions/inactions of the user of the client device 30 and for operation of the recognition server 204 to name a few, other events are specified in Appendix B. For instance, mumbling, where the speech recognizer detects that the user has spoken but is unable to recognize the words and silence, where speech is not detected at all, are specified in the QA control 320. These events reference client-side script functions defined by the author. In a multimodal application specified earlier, a simple mumble handler that puts an error message in the text box could be written as follows:

```
<Speech:QA
    controlsToSpeechEnable="txtDepCity"
    onClientNoReco="OnMumble( )"
    runat="server">
    <Answer id="AnsDepCity"
        StartEvent="onMouseDown"
        StopEvent="onMouseUp"
        >
        <grammar src="/grammars/depCities.gram"/>
        <bind value="//sml/DepCity"
        targetElement="txtCity" />
    </Answer>
</Speech:QA>
<script>
    function OnMumble( ) {
        txtDepCity.value="...recognition
        error...";
    }
</script>
```

Control Execution Algorithm

In one embodiment, a client-side script or module (herein referred to as "RunSpeech") is provided to the client device. The purpose of this script is to execute dialog flow via logic, which is specified in the script when executed on the client device 30, i.e. when the markup pertaining to the controls is activated for execution on the client due to values contained therein. The script allows multiple dialog turns between page requests, and therefore, is particularly helpful for control of voice-only dialogs such as through telephony browser 216. The client-side script RunSpeech is executed in a loop manner on the client device 30 until a completed form in submitted, or a new page is otherwise requested from the client device 30.

It should be noted that in one embodiment, the controls can activate each other (e.g. question control activating a selected answer control) due to values when executed on the client. However, in a further embodiment, the controls can "activate" each other in order to generate appropriate markup, in which case server-side processing may be implemented.

Generally, in one embodiment, the algorithm generates a dialog turn by outputting speech and recognizing user input. The overall logic of the algorithm is as follows for a voice-only scenario:

1. Find next active output companion control;
2. If it is a statement, play the statement and go back to 1; If it is a question or a confirm go to 3;
3. Collect expected answers;
4. Collect commands;
5. Play output control and listen in for input;
6. Activate recognized Answer or Command object or, issue an event if none is recognized;
7. Go back to 1.

In the multimodal case, the logic is simplified to the following algorithm:

1. Wait for triggering event—i.e., user tapping on a control;
2. Collect expected answers;
3. Listen in for input;
4. Activate recognized Answer object or, if none, throw event;
5. Go back to 1.

The algorithm is relatively simple because, as noted above, controls contain built-in information about when they can be activated. The algorithm also makes use of the role of the controls in the dialogue. For example statements are played immediately, while questions and confirmations are only played once the expected answers have been collected.

In a further embodiment, implicit confirmation can be provided whereby the system confirms a piece of information and asks a question at the same time. For example the system could confirm the arrival city of a flight and ask for the travel date in one utterance: "When do you want to go to Seattle?" (i.e. asking 'when' and implicitly confirming 'destination: Seattle'). If the user gives a date then the city is considered implicitly accepted since, if the city was wrong, users would have immediately challenged it. In this scenario, it becomes clear that the knowledge of what a user is trying to achieve is vitally important: are they answering the question, or are they correcting the value, or are they asking for help? By using the role of the user input in the dialogue the system can know when to implicitly accept a value.

In summary, a dialog is created due to the role of the control in the dialog and the relationship with other controls, wherein the algorithm executes the controls and thus manages the dialog. Each control contains information based on its type which is used by the execution algorithm to select (i.e. make active for execution) a given control according to whether or not it serves a useful purpose at that point in the dialog on the client. For example, confirmation controls are only active when there is a value to confirm and the system does not have sufficient confidence in that value to proceed. In a further implementation, most of these built-in pieces of information can be overridden or otherwise adapted by application developers.

The following table summarizes the controls, their corresponding role in the dialog and the relationship with other controls.

| Control | Role in dialogue | Relationship with other controls |
| --- | --- | --- |
| Statement | output: present information to users | (none) |
| Question | output: ask question | selects expected Answers as a response |
| Confirmation | output: confirm a value obtained from the user | selects potential input controls as a response, typically Accept, Deny, Correct |
| Answer | input: provide an answer to a question | selected by Question/Confirmation |
| Command | input: seek to repair a dialog, or change the topic of conversation | scoped to other controls |
| Accept | input: confirm a value in response to a confirmation | selected by a confirmation |
| Deny | input: deny a value in response to a confirmation | selected by a confirmation |
| Correct | input: correct a value in response to a confirmation | selected by a confirmation |
| QA | | (wrapper: contains all the controls related to a specific topic) |

The use of these controls may be explained with an illustration of a simple human/computer dialog. In the dialog below, each dialog turn on the part of the System or the User is characterized according to the control (indicated in parentheses) which reflects its purpose in the dialog.

1. System (Statement): "Welcome to the travel booking service".
2. System (Question): "Where would you like to go?"
3. User (Answer): "San Francisco."
4. System (Confirmation): "Did you say Seattle?"
5. User (Deny): "No."
6. System (Question): "Where would you like to go?"
7. User (Answer): "San Francisco."
8. System (Confirmation): "Did you say Seattle?"
9. User (Correct): "I said San Francisco."
10. System (Confirmation): "Did you say San Francisco?"
11. User (Correct): "Yes."
12. System (Question): "When would you like to leave?"
13. User (Command): "Help."

Turn 1 is a statement on the part of the System. Since a statement control activates no answer controls in response, the system does not expect input. The system goes on to activate a question control at turn 2. This in turn activates a set of possible answer controls, including one which holds a grammar containing the cities available through the service, including "San Francisco", "Seattle", etc., which permits the user to provide such a city in turn 3.

The user's turn 3 is misrecognized by the system. Although the system believes it has a value from an answer control for the city, its confidence in that value is low (rightly so, since it has recognized incorrectly). This low confidence value in a just-received answer control is sufficient information for RunSpeech to trigger a confirmation control on the part of the system, as generated at turn 4. The confirmation control in turn activates a deny control, a correct control and an accept control and makes their respective grammars available to recognize the user's next turn. User turns 5, 9 and 11 illustrate example responses for these controls. Turn 5 of the user simply denies the value "no". This has the effect of removing the value from the system, so the next action of RunSpeech is to ask the question again to re-obtain the value (turn 6).

Turns 7 and 8 return us to a confirmation control as with 3 and 4.

User turn 9 is a correct control, which has again been activated as a possible response to the confirmation control. A correct control not only denies the value undergoing confirmation, it also provides a new value. So user turn 9 is recognized by the system as a correct control with a new value which, correctly this time, is recognized as "San Francisco".

The system's confidence in the new value is low, however, and yet another confirmation control is generated at turn 10. This in turn activates accept, deny and correct controls in response, and user turn 11 ("Yes" matches an accept control grammar. The recognition of the accept control has the effect of 'grounding' the system's belief in the value which it is trying to obtain, and so RunSpeech is now able to select other empty values to obtain. In turn 12, a new question control is output which asks for a date value. The user's response this time (turn 13) is a command: "help". Command controls are typically activated in global fashion, that is, independently of the different question controls and confirmation controls on the part of the system. In this way the user is able to ask for help at any time, as he does in turn 13. Command controls may also be more sensitively enabled by a mechanism that scopes their activation according to which part of the primary control structure is being talked about.

Referring back to the algorithm, in one exemplary embodiment, the client-side script RunSpeech examines the values inside each of the primary controls and an attribute of the QA control, and any selection test of the QA controls on the current page, and selects a single QA control for execution. For example, within the selected QA control, a single question and its corresponding prompt are selected for output, and then a grammar is activated related to typical answers to the corresponding question. Additional grammars may also be activated, in parallel, allowing other commands (or other answers), which are indicated as being allowable. Assuming recognition has been made and any further processing on the input data is complete, the client-side script RunSpeech will begin again to ascertain which QA control should be executed next. An exemplary implementation and algorithm of RunSpeech is provided in Appendix B.

It should be noted that the use of the controls and the RunSpeech algorithm or module is not limited to the client/server application described above, but rather can be adapted for use with other application abstractions. For instance, an application such as VoiceXML, which runs only on the client device 30, could conceivably include further elements or controls such as question and answer provided above as part of the VoiceXML browser and operating in the same manner. In this case the mechanisms of the RunSpeech algorithm described above could be executed by default by the browser without the necessity for extra script. Similarly, other platforms such as finite state machines can be adapted to include the controls and RunSpeech algorithm or module herein described.

Synchronization

As noted above, the companion controls 306 are associated with the primary controls 302 (the existing controls on the page). As such the companion controls 306 can re-use the business logic and presentation capabilities of the primary controls 302. This is done in two ways: storing values in the primary controls 302 and notifying the primary controls of the changes 302.

The companion controls 306 synchronize or associates their values with the primary controls 302 via the mechanism called binding. Binding puts values retrieved from recognizer into the primary controls 302, for example putting text into a textbox, herein exemplified with the answer control. Since primary controls 302 are responsible for visual presentation, this provides visual feedback to the users in multimodal scenarios.

The companion controls 306 also offer a mechanism to notify the primary controls 302 that they have received an input via the recognizer. This allows the primary controls 302 to take actions, such as invoking the business logic. (Since the notification amounts to a commitment of the companion controls 306 to the values which they write into the primary controls 302, the implementation provides a mechanism to control this notification with a fine degree of control. This control is provided by the RejectThreshold and ConfirmThreshold properties on the answer control, which specify numerical acoustic confidence values below which the system should respectively reject or attempt to confirm a value.)

Although the present invention has been described with reference to preferred embodiments, workers skilled in the art will recognize that changes may be made in form and detail without departing from the spirit and scope of the invention.

APPENDIX A

1 Introduction

The following tags are a set of markup elements that allows a document to use speech as an input or output medium. The tags are designed to be self-contained XML that can be imbedded into any SGML derived markup languages such as HTML, XHTML, cHTML, SMIL, WML and the like. The tags used herein are similar to SAPI 5.0, which are known methods available from Microsoft Corporation of Redmond, Wash. The tags, elements, events, attributes, properties, return values, etc, are merely exemplary and should not be considered limiting. Although exemplified herein for speech and DTMF recognition, similar tags can be provided for other forms of recognition.

The main elements herein discussed are:
<prompt . . . > for speech synthesis configuration and prompt playing
<reco . . . > for recognizer configuration and recognition execution and post-processing
<grammar . . . > for specifying input grammar resources
<bind . . . > for processing of recognition results
<dtmf . . . > for configuration and control of DTMF 2 Reco The Reco element is used to specify possible user inputs and a means for dealing with the input results.

As such, its main elements are <grammar> and <bind>, and it contains resources for configuring recognizer properties.

Reco elements are activated programmatically in uplevel browsers via Start and Stop methods, or in SMIL-enabled browsers by using SMIL commands. They are considered active declaratively in downlevel browsers (i.e. non script-supporting browsers) by their presence on the page. In order to permit the activation of multiple grammars in parallel, multiple Reco elements may be considered active simultaneously.

Recos may also take a partcular mode—'automatic', 'single' or 'multiple'—to distinguish the kind of recognition scenarios which they enable and the behaviour of the recognition platform.

2.1 Reco Content

The Reco element contains one or more grammars and optionally a set of bind elements which inspect the results of recognition and copy the relevant portions to values in the containing page.

In uplevel browsers, Reco supports the programmatic activation and deactivation of individual grammar rules. Note also that all top-level rules in a grammar are active by default for a recognition context.

2.1.1 <Grammar> Element

The grammar element is used to specify grammars, either inline or referenced using the src attribute. At least one grammar (either inline or referenced) is typically specified. Inline grammars can be text-based grammar formats, while referenced grammars can be text-based or binary type. Multiple grammar elements may be specified. If more than one grammar element is specified, the rules within grammars are added as extra rules within the same grammar. Any rules with the same name will be overwritten.

Attributes:
src: Optional if inline grammar is specified. URI of the grammar to be included. Note that all top-level rules in a grammar are active by default for a recognition context.
langID: Optional. String indicating which language speech engine should use. The string format follows the xml:lang definition. For example, langID="en-us" denotes US English. This attribute is only effective when the langID is not specified in the grammar URI. If unspecified, defaults to US English.
If the langID is specified in multiple places then langID follows a precedence order from the lowest scope—remote grammar file (i.e language id is specified within the grammar file) followed by grammar element followed by reco element.

```
<grammar src="FromCity.xml" />
    or
<grammar>
    <rule toplevel="active">
        <p>from </p>
        <ruleref name="cities" />
    </rule>
    <rule name="cities">
        <l>
            <p> Cambridge </p>
            <p> Seattle </p>
            <p> London </p>
        </l>
    </rule>
</grammar>
```

If both a src-referenced grammar and an inline grammar are specified, the inline rules are added to the referenced rules, and any rules with the same name will be overwritten.

2.1.2 <Bind> Element

The bind element is used to bind values from the recognition results into the page.

The recognition results consumed by the bind element can be an XML document containing a semantic markup language (SML) for specifying recognition results. Its contents include semantic values, actual words spoken, and confidence scores. SML could also include alternate recognition choices (as in an N-best recognition result). A sample SML document for the utterance "I'd like to travel from Seattle to Boston" is illustrated below:

```
<sml confidence="40">
    <travel text="I'd like to travel from
Seattle to Boston">
        <origin_city confidence="45"> Seattle
</origin_city>
        <dest_city confidence="35"> Boston
</dest_city>
    </travel>
</sml>
```

Since an in-grammar recognition is assumed to produce an XML document—in semantic markup language, or SML—the values to be bound from the SML document are referenced using an XPath query. And since the elements in the page into which the values will be bound should be are uniquely identified (they are likely to be form controls), these target elements are referenced directly.

Attributes:
  targetElement: Required. The element to which the value content from the SML will be assigned (as in W3C SMIL 2.0).
  targetAttribute: Optional. The attribute of the target element to which the value content from the SML will be assigned (as with the attributeName attribute in SMIL 2.0). If unspecified, defaults to "value".
  test: Optional. An XML Pattern (as in the W3C XML DOM specification) string indicating the condition under which the recognition result will be assigned. Default condition is true.
  value: Required. An XPATH (as in the W3C XML DOM specification) string that specifies the value from the recognition result document to be assigned to the target element.

Example:
So given the above SML return, the following reco element uses bind to transfer the values in origin_city and dest_city into the target page elements txtBoxOrigin and txtBoxDest:

```
<input name="txtBoxOrigin" type="text"/>
<input name="txtBoxDest" type="text" />
<reco id="travel">
    <grammar src="./city.xml" />
    <bind targetElement="txtBoxOrigin"
        value="//origin_city" />
    <bind targetElement="txtBoxDest"
        value="//dest_city" />
</reco>
```

This binding may be conditional, as in the following example, where a test is made on the confidence attribute of the dest_city result as a pre-condition to the bind operation:

```
<bind targetElement="txtBoxDest"
    value="//dest_city"
    test="/sml/dest_city[@confidence $gt$ 40]"
/>
```

The bind element is a simple declarative means of processing recognition results on downlevel or uplevel browsers. For more complex processing, the reco DOM object supported by uplevel browsers implements the onReco event handler to permit programmatic script analysis and post-processing of the recognition return.

2.2 Attributes and Properties

The following attributes are supported by all browsers, and the properties by uplevel browsers.

2.2.1 Attributes

The following attributes of Reco are used to configure the speech recognizer for a dialog turn.

initialTimeout: Optional. The time in milliseconds between start of recognition and the detection of speech. This value is passed to the recognition platform, and if exceeded, an onSilence event will be provided from the recognition platform (see 2.4.2). If not specified, the speech platform will use a default value.
  babbleTimeout: Optional. The period of time in milliseconds in which the recognizer must return a result after detection of speech. For recos in automatic and single mode, this applies to the period between speech detection and the stop call. For recos in 'multiple' mode, this timeout applies to the period between speech detection and each recognition return—i.e. the period is restarted after each return of results or other event. If exceeded, different events are thrown according to whether an error has occurred or not. If the recognizer is still processing audio—eg in the case of an exceptionally long utterance—the onNoReco event is thrown, with status code 13 (see 2.4.4). If the timeout is exceeded for any other reason, however, a recognizer error is more likely, and the onTimeout event is thrown. If not specified, the speech platform will default to an internal value.
  maxTimeout: Optional. The period of time in milliseconds between recognition start and results returned to the browser. If exceeded, the onTimeout event is thrown by the browser—this caters for network or recognizer failure in distributed environments. For recos in 'multiple' mode, as with babbleTimeout, the period is restarted after the return of each recognition or other event. Note that the maxTimeout attribute should be greater than or equal to the sum of initialTimeout and babbleTimeout. If not specified, the value will be a browser default.
  endSilence: Optional. For Recos in automatic mode, the period of silence in milliseconds after the end of an utterance which must be free of speech after which the recognition results are returned. Ignored for recos of modes other than automatic. If unspecified, defaults to platform internal value.
  reject: Optional. The recognition rejection threshold, below which the platform will throw the 'no reco' event. If not specified, the speech platform will use a default value. Confidence scores range between 0 and 100 (integer). Reject values lie in between server: Optional. URI of speech platform (for use when the tag interpreter and recognition platform are not co-located). An example value might be server=protocol://yourspeechplatform. An application writer is also able to provide speech platform specific settings by adding a querystring to the URI string, eg protocol://yourspeechplatform?bargeinEnergyThreshold=0.5.
  langID: Optional. String indicating which language speech engine should use. The string format follows the xml:lang definition. For example, langID="en-us" denotes US English. This attribute is only effective when the langID is not specified in the grammar element (see 2.1.1).

mode: Optional. String specifying the recognition mode to be followed. If unspecified, defaults to "automatic" mode.

2.2.2 Properties

The following properties contain the results returned by the recognition process (these are supported by uplevel browsers).

recoResult Read-only. The results of recognition, held in an XML DOM node object containing semantic markup language (SML), as described in 2.1.2, In case of no recognition, the property returns null.

text Read-only. A string holding the text of the words recognized (i.e., a shorthand for contents of the text attribute of the highest level element in the SML recognition return in recoResult.

status: Read-only. Status code returned by the recognition platform. Possible values are 0 for successful recognition, or the failure values −1 to −4 (as defined in the exceptions possible on the Start method (section 2.3.1) and Activate method (section 2.3.4)), and statuses −11 to −15 set on the reception of recognizer events (see 2.4).

2.3 Object Methods

Reco activation and grammar activation may be controlled using the following methods in the Reco's DOM object. With these methods, uplevel browsers can start and stop Reco objects, cancel recognitions in progress, and activate and deactivate individual grammar top-level rules (uplevel browsers only).

2.3.1 Start

The Start method starts the recognition process, using as active grammars all the top-level rules for the recognition context which have not been explicitly deactivated.

Syntax:
Object.Start( )
Return value:
None.
Exception:
The method sets a non-zero status code and fires an onNoReco event when fails. Possible failures include no grammar (reco status=−1), failure to load a grammar, which could be a variety of reasons like failure to compile grammar, non-existent URI (reco status=−2), or speech platform errors (reco status=−3).

2.3.2 Stop

The Stop method is a call to end the recognition process. The Reco object stops recording audio, and the recognizer returns recognition results on the audio received up to the point where recording was stopped. All the recognition resources used by Reco are released, and its grammars deactivated. (Note that this method need not be used explicitly for typical recognitions in automatic mode, since the recognizer itself will stop the reco object on endpoint detection after recognizing a complete sentence.) If the Reco has not been started, the call has no effect.

Syntax:
Object.Stop( )
Return value:
None.
Exception:
None.

2.3.3 Cancel

The Cancel method stops the audio feed to the recognizer, deactivates the grammar and releases the recognizer and discards any recognition results. The browser will disregard a recognition result for canceled recognition. If the recognizer has not been started, the call has no effect.

Syntax:
Object.Cancel( )
Return value:
None.
Exception:
None.

2.3.4 Activate

The Activate method activates a top-level rule in the context free grammar (CFG). Activation must be called before recognition begins, since it will have no effect during a 'Started' recognition process. Note that all the grammar top-level rules for the recognition context which have not been explicitly deactivated are already treated as active.

Syntax:
Object.Activate(strName);
Parameters:
strName: Required. Rule name to be activated.
Return value:
None.
Exception:
None.

2.3.5 Deactivate

The method deactivates a top-level rule in the grammar. If the rule does not exist, the method has no effect.

Syntax:
Object.Deactivate(strName);
Parameters:
strName: Required. Rule name to be deactivated. An empty string deactivates all rules.
Return value
None.
Exception
None.

2.4 Reco Events

The Reco DOM object supports the following events, whose handlers may be specified as attributes of the reco element.

2.4.1 onReco:

This event gets fired when the recognizer has a recognition result available for the browser. For recos in automatic mode, this event stops the recognition process automatically and clears resources (see 2.3.2). OnReco is typically used for programmatic analysis of the recognition result and processing of the result into the page.

Syntax:

| Inline HTML | <Reco onReco ="handler" > |
| Event property | Object.onReco = handler; |
| | Object.onReco = GetRef("handler"); |

| Event Object Info: | |
| --- | --- |
| Bubbles | No |
| To invoke | User says something |
| Default action | Return recognition result object |

Event Properties:
Although the event handler does not receive properties directly, the handler can query the event object for data (see the use of the event object in the example below).

Example

The following XHTML fragment uses onReco to call a script to parse the recognition outcome and assign the values to the proper fields.

```
<input name="txtBoxOrigin" type="text" />
<input name="txtBoxDest" type="text" />
    <reco onReco="processCityRecognition( )"/>
        <grammar src="/grammars/cities.xml" />
    </reco>
    <script><![CDATA[
        function processCityRecognition ( ) {
            smlResult = event.srcElement.recoResult;
            origNode = smlResult.selectSingleNode("//origin_city");
            if (origNode != null)
                txtBoxOrigin.value = origNode.text;
            destNode = smlResult.selectSingleNode("//dest_city");
            if (destNode != null) txtBoxDest.value = destNode.text;
        }
    ]]></script>
```

2.4.2 onSilence:

onSilence handles the event of no speech detected by the recognition platform before the duration of time specified in the initialTimeout attribute on the Reco (see 2.2.1). This event cancels the recognition process automatically for the automatic recognition mode.

| Syntax: | |
| --- | --- |
| Inline HTML | <reco onSilence="handler" ...> |
| Event property (in ECMAScript) | Object.onSilence = handler Object.onSilence = GetRef("handler"); |

| Event Object Info: | |
| --- | --- |
| Bubbles | No |
| To invoke | Recognizer did not detect speech within the period specified in the initialTimeout attribute. |
| Default action | Set status = −11 |

Event Properties:

Although the event handler does not receive properties directly, the handler can query the event object for data.

2.4.3 onTimeout onTimeout handles two types of event which typically reflect errors from the speech platform.

It handles the event thrown by the tags interpreter which signals that the period specified in the maxtime attribute (see 2.2.1) expired before recognition was completed. This event will typically reflect problems that could occur in a distributed architecture.

It also handles (ii) the event thrown by the speech recognition platform when recognition has begun but processing has stopped without a recognition within the period specified by babbleTimeout (see 2.2.1).

This event cancels the recognition process automatically.

| Syntax: | |
| --- | --- |
| Inline HTML | <reco onTimeout="handler" ...> |
| Event property (in ECMAScript) | Object.onTimeOut = handler Object.onTimeOut = GetRef("handler"); |

| Event Object Info: | |
| --- | --- |
| Bubbles | No |
| To invoke | Thrown by the browser when the period set by the maxtime attribute expires before recognition is stopped. |
| Default action | Set reco status to −12. |

Event Properties:

Although the event handler does not receive properties directly, the handler can query the event object for data.

2.4.4 onNoReco:

onNoReco is a handler for the event thrown by the speech recognition platform when it is unable to return valid recognition results. The different cases in which this may happen are distinguished by status code. The event stops the recognition process automatically.

| Syntax: | |
| --- | --- |
| Inline HTML | <Reco onNoReco ="handler" > |
| Event property | Object.onNoReco = handler; Object.onNoReco = GetRef("handler"); |

| Event Object Info: | |
| --- | --- |
| Bubbles | No |
| To invoke | Recognizer detects sound but is unable to interpret the utterance. |
| Default action | Set status property and return null recognition result. Status codes are set as follows: status −13: sound was detected but no speech was able to be interpreted; status −14: some speech was detected and interpreted but rejected with insufficient confidence (for threshold setting, see the reject attribute in 2.2.1). status −15: speech was detected and interpreted, but a complete recognition was unable to be returned between the detection of speech and the duration specified in the babbleTimeout attribute (see 2.2.1). |

Event Properties:

Although the event handler does not receive properties directly, the handler can query the event object for data.

3 Prompt

The prompt element is used to specify system output. Its content may be one or more of the following:

inline or referenced text, which may be marked up with prosodic or other speech output information;
variable values retrieved at render time from the containing document;
links to audio files.

Prompt elements may be interpreted declaratively by downlevel browsers (or activated by SMIL commands), or by object methods on uplevel browsers.

3.1 Prompt Content

The prompt element contains the resources for system output, either as text or references to audio files, or both.

Simple prompts need specify only the text required for output, eg:

```
<prompt id="Welcome">
    Thank you for calling ACME weather report.
</prompt>
```
This simple text may also contain further markup of any of the kinds described below.

3.1.1 Speech Synthesis Markup

Any format of speech synthesis markup language can be used inside the prompt element. (This format may be specified in the 'tts' attribute described in 3.2.1.) The following example shows text with an instruction to emphasize certain words within it:
```
<prompt id="giveBalance">
    You have <emph> five dollars </emph> left in your
        account.
</prompt>
```

3.1.2 Dynamic Content

The actual content of the prompt may need to be computed on the client just before the prompt is output. In order to confirm a particular value, for example, the value needs to be dereferenced in a variable. The value element may be used for this purpose.

Value Element value: Optional. Retrieves the values of an element in the document.

Attributes:

targetElement: Optional. Either href or targetElement must be specified. The id of the element containing the value to be retrieved.

targetAttribute: Optional. The attribute of the element from which the value will be retrieved.

href: Optional. The URI of an audio segment. href will override targetElement if both are present.

The targetElement attribute is used to reference an element within the containing document. The content of the element whose id is specified by targetElement is inserted into the text to be synthesized. If the desired content is held in an attribute of the element, the targetAttribute attribute may be used to specify the necessary attribute on the targetElement. This is useful for dereferencing the values in HTML form controls, for example. In the following illustration, the "value" attributes of the "txtBoxOrigin" and "txtBoxDest" elements are inserted into the text before the prompt is output

```
<prompt id="Confirm" >
    Do you want to travel from
        <value targetElement="txtBoxOrigin"
targetAttribute="value" />
    to
        <value targetElement="txtBoxDest"
targetAttribute="value" />
    ?
</prompt >
```

3.1.3 Audio Files

The value element may also be used to refer to a prerecorded audio file for playing instead of, or within, a synthesized prompt. The following example plays a beep at the end of the prompt:
```
<prompt>
    After the beep, please record your message.
```

```
    <value href="/wav/beep.wav" />
</prompt>
```

3.1.4 Referenced Prompts

Instead of specifying content inline, the src attribute may be used with an empty element to reference external content via URI, as in:
```
<prompt id="Welcome"
src="/ACMEWeatherPrompts#Welcome"/>
```
The target of the src attribute can hold any or all of the above content specified for inline prompts.

3.2 Attributes and Properties

The prompt element holds the following attributes (downlevel browsers) and properties (downlevel and uplevel browsers).

3.2.1 Attributes tts: Optional. The markup language type for text-to-speech synthesis. Default is "SAPI 5".

src: Optional if an inline prompt is specified. The URI of a referenced prompt (see 3.1.4).

bargein: Optional. Integer. The period of time in milliseconds from start of prompt to when playback can be interrupted by the human listener. Default is infinite, i.e., no bargein is allowed. Bargein=0 allows immediate bargein. This applies to whichever kind of barge-in is supported by platform. Either keyword or energy-based bargein times can be configured in this way, depending on which is enabled at the time the reco is started.

prefetch: Optional. A Boolean flag indicating whether the prompt should be immediately synthesized and cached at browser when the page is loaded. Default is false.

3.2.2 Properties

Uplevel browsers support the following properties in the prompt's DOM object.

bookmark: Read-only. A string object recording the text of the last synthesis bookmark encountered.

status: Read-only. Status code returned by the speech platform.

3.3 Prompt Methods

Prompt playing may be controlled using the following methods in the prompt's DOM object. In this way, uplevel browsers can start and stop prompt objects, pause and resume prompts in progress, and change the speed and volume of the synthesized speech.

3.3.1 Start

Start playback of the prompt. Unless an argument is given, the method plays the contents of the object. Only a single prompt object is considered 'started' at a given time, so if Start is called in succession, all playbacks are played in sequence.

Syntax:

Object.Start([strText])

Parameters:

strText: the text to be sent to the synthesizer. If present, this argument overrides the contents of the object.

Return value:

None.

Exception:

Set status=−1 and fires an onComplete event if the audio buffer is already released by the server.

3.3.2 Pause

Pause playback without flushing the audio buffer. This method has no effect if playback is paused or stopped.

Syntax:

Object.Pause( );

Return value:

None.

Exception:

None.

3.3.3 Resume

Resume playback without flushing the audio buffer. This method has no effect if playback has not been paused.

Syntax:
    Object.Resume( );
Return value:
    None.
Exception:
    Throws an exception when resume fails.

3.3.4 Stop

Stop playback, if not already, and flush the audio buffer. If the playback has already been stopped, the method simply flushes the audio buffer.

Syntax:
    Object.Stop( )
Return value:
    None.
Exception:
    None.

3.3.5 Change

Change speed and/or volume of playback. Change may be called during playback.

Syntax:
    Object.Change(speed, volume);
Parameters:
    speed: Required. The factor to change. Speed=2.0 means double the current rate, speed=0.5 means halve the current rate, speed=0 means to restore the default value.
    volume: Required. The factor to change. Volume=2.0 means double the current volume, volume=0.5 means halve the current volume, volume=0 means to restore the default value.
Return value:
    None.
Exception:
    None.

3.3.6 Prompt Control Example

The following example shows how control of the prompt using the methods above might be authored for a platform which does not support a keyword barge-in mechanism.

```
<html>
<title>Prompt control</title>
<head>
    <script>
        <!--
        function checkKWBargein( ) {
            news.change(1.0, 0.5); // turn down the volume while verifying
            if (keyword.text == "") { // result is below threshold
                news.change(1.0, 2.0); // restore the volume
                keyword.Start( ); // restart the recognition
            } else {
                news.Stop( ); // keyword detected! Stop the prompt
                // Do whatever that is necessary
            }
        }
        //
    </script>
    <script for="window" event="onload">
        <!--
        news.Start( ); keyword.Start( );
        //
    </script>
```

```
</head>
<body>
    <prompt id="news" bargein="0">
```

Stocks turned in another lackluster performance Wednesday as investors received little incentive to make any big moves ahead of next week's Federal Reserve meeting. The tech-heavy Nasdaq Composite Index dropped 42.51 points to close at 2156.26. The Dow Jones Industrial Average fell 17.05 points to 10866.46 after an early-afternoon rally failed.

```
- <!--
    </prompt>
    <reco id="keyword"
        reject="70"
        onReco="checkKWBargein( )" >
        <grammar
        src=http://denali/news bargein grammar.xml />
    </reco>
</body>
</html>
```

3.4 Prompt Events

The prompt DOM object supports the following events, whose handlers may be specified as attributes of the prompt element.

3.4.1 onBookmark

Fires when a synthesis bookmark is encountered. The event does not pause the playback.

| Syntax: | |
|---|---|
| Inline HTML | <prompt onBookmark="handler" ...> |
| Event property | Object.onBookmark = handler<br>Object.onBookmark = GetRef("handler"); |
| Event Object Info: | |
| Bubbles | No |
| To invoke | A bookmark in the rendered string is encountered |
| Default action | Returns the bookmark string |

Event Properties:

Although the event handler does not receive properties directly, the handler can query the event object for data.

3.4.2 onBargein:

Fires when a user's barge-in event is detected. (Note that determining what constitutes a barge-in event, eg energy detection or keyword recognition, is up to the platform.) A specification of this event handler does not automatically turn the barge-in on.

| Syntax: | |
|---|---|
| Inline HTML | <prompt onBargein="handler" ...> |
| Event property | Object.onBargein = handler<br>Object.onBargein = GetRef("handler"); |

| Event Object Info: | |
|---|---|
| Bubbles | No |
| To invoke | A barge in event is encountered |
| Default action | None |

Event Properties:
Although the event handler does not receive properties directly, the handler can query the event object for data.

3.4.3 onComplete:
Fires when the prompt playback reaches the end or exceptions (as defined above) are encountered.

| Syntax: | |
|---|---|
| Inline HTML | <prompt onComplete="handler" ...> |
| Event property | Object. onComplete = handler<br>Object. onComplete = GetRef("handler"); |

| Event Object Info: | |
|---|---|
| Bubbles | No |
| To invoke | A prompt playback completes |
| Default action | Set status = 0 if playback completes normally, otherwise set status as specified above. |

Event Properties:
Although the event handler does not receive properties directly, the handler can query the event object for data.

3.4.4 Using Bookmarks and Events

The following example shows how bookmark events can be used to determine the semantics of a user response—either a correction to a departure city or the provision of a destination city—in terms of when bargein happened during the prompt output. The onBargein handler calls a script which sets a global 'mark' variable to the last bookmark encountered in the prompt, and the value of this 'mark' is used in the reco's postprocessing function ('heard') to set the correct value.

```
<script><![CDATA[
    var mark;
    function interrupt( ) {
        mark = event.srcElement.bookmark;
    }
    function ProcessCityConfirm( ) {
        confirm.stop( ); // flush the audio buffer
        if (mark == "mark_origin_city")
            txtBoxOrigin.value = event.srcElement.text;
        else
            txtBoxDest.value = event.srcElement.text;
    }
]]></script>
<body>
    <input name="txtBoxOrigin" value="Seattle" type="text"/>
    <input name="txtBoxDest" type="text" />
    ...
    <prompt id="confirm" onBargein="interrupt ( )" bargein="0">
        From <bookmark mark="mark_origin_city" />
        <value targetElement="orgin" targetAttribute="value" />,
```
please say <bookmark mark="mark_dest_city" /> the
    destination city you want to travel to.
</prompt>
<reco onReco="ProcessCityConfirm( )" >
    <grammar src="/grm/1033/cities.xml" />
</reco>
...
</body>
```

4 DTMF

Creates a DTMF recognition object. The object can be instantiated using inline markup language syntax or in scripting. When activated, DTMF can cause prompt object to fire a barge-in event. It should be noted the tags and eventing discussed below with respect to DTMF recognition and call control discussed in Section generally pertain to interaction between the voice browser 216 and media server 214.

4.1 Content dtmfgrammar: for inline grammar.
bind: assign DTMF conversion result to proper field.

Attributes:
targetElement: Required. The element to which a partial recognition result will be assigned to (cf. same as in W3C SMIL 2.0).
targetAttribute: the attribute of the target element to which the recognition result will be assigned to (cf. same as in SMIL 2.0). Default is "value".
test: condition for the assignment. Default is true.

Example 1

Map Keys to Text

```
<input type="text" name="city"/>
<DTMF id="city_choice" timeout="2000" numDigits="1">
    <dtmfgrammar>
        <key value="1">Seattle</key>
        <key value="2">Boston</key>
    </dtmfgrammar>
    <bind targetElement="city" targetAttribute="value" />
</DTMF>
```

When "city choice" is activated, "Seattle" will be assigned to the input field if the user presses 1, "Boston" if 2, nothing otherwise.

Example 2

How DTMF Can be Used With Multiple Fields

```
<input type="text" name="area_code" />
<input type="text" name="phone_number" />
<DTMF id="areacode" numDigits="3" onReco="extension.Activate( )">
    <bind targetElement="area_code" />
</DTMF>
<DTMF id="extension" numDigits="7">
    <bind targetElement="phone_number" />
</DTMF>
```

This example demonstrates how to allow users entering into multiple fields.

Example 3

How to Allow Both Speech and DTMF Inputs and Disable Speech When User Starts DTMF

```
<input type="text" name="credit_card_number" />
<prompt onBookmark="dtmf.Start( ); speech.Start( )"
     bargein="0">
    Please say <bookmark name="starting" />
    or enter your credit card number now
</prompt>
<DTMF id="dtmf" escape="#" length="16"
interdigitTimeout="2000"
        onkeypress="speech.Stop( )">
    <bind targetElement="credit_card_number" />
</DTMF>
<reco id="speech" >
    <grammar src="/grm/1033/digits.xml" />
    <bind targetElement="credit_card_number" />
</reco>
```

4.2 Attributes and Properties
4.2.1 Attributes
dtmfgrammar: Required. The URI of a DTMF grammar.
4.2.2 Properties
DTMFgrammar Read-Write.
An XML DOM Node object representing DTMF to string conversion matrix (also called DTMF grammar). The default grammar is

```
<dtmfgrammar>
    <key value="0">0</key>
    <key value="1">1</key>
    ...
    <key value="9">9</key>
    <key value="*">*</key>
    <key value="#">#</key>
</dtmfgrammar >
``` flush
Read-write, a Boolean flag indicating whether to automatically flush the DTMF buffer on the underlying telephony interface card before activation. Default is false to enable type-ahead.
escape
Read-Write. The escape key to end the DTMF reading session. Escape key is one key.
numDigits
Read-Write. Number of key strokes to end the DTMF reading session. If both escape and length are specified, the DTMF session is ended when either condition is met.
dtmfResult
Read-only string, storing the DTMF keys user has entered. Escape is included in result if typed.
text
Read-only string storing white space separated token string, where each token is converted according to DTMF grammar.
initialTimeout
Read-Write. Timeout period for receiving the first DTMF keystoke, in milliseconds. If unspecified, defaults to the telephony platform's internal setting.
interdigitTimeout
Read-Write. Timeout period for adjacent DTMF keystokes, in milliseconds. If unspecified, defaults to the telephony platform's internal setting.
4.3 Object Methods:
4.3.1 Start
Enable DTMF interruption and start a DTMF reading session.
Syntax:
Object.Start( );
Return value:
None
Exception:
None
4.3.2 Stop
Disable DTMF. The key strokes entered by the user, however, remain in the buffer.
Syntax:
Object.Stop( );
Return value:
None
Exception:
None
4.3.3 Flush
Flush the DTMF buffer. Flush can not be called during a DTMF session.
Syntax:
Object.Flush( );
Return value:
None
Exception:
None
4.4 Events
4.4.1 onkeypress
Fires when a DTMF key is press. This overrides the default event inherited from the HTML control. When user hits the escape key, the onRec event fires, not onKeypress.

| Syntax: | |
|---|---|
| Inline HTML | <DTMF onkeypress="handler" ...> |
| Event property | Object.onkeypress = handler |
| | Object.onkeypress = GetRef("handler"); |

| Event Object Info: | |
|---|---|
| Bubbles | No |
| To invoke | Press on the touch-tone telephone key pad |
| Default action | Returns the key being pressed |

Event Properties:
Although the event handler does not receive properties directly, the handler can query the event object for data.
4.4.2 onReco
Fires when a DTMF session is ended. The event disables the current DTMF object automatically.

| Syntax: | |
|---|---|
| Inline HTML | <DTMF onReco="handler" ...> |
| Event property | Object.onReco = handler |
| | Object.onReco = GetRef("handler"); |

-continued

| Event Object Info: | |
|---|---|
| Bubbles | No |
| To invoke | User presses the escape key or the number of key strokes meets specified value. |
| Default action | Returns the key being pressed |

Event Properties:

Although the event handler does not receive properties directly, the handler can query the event object for data.

4.4.3 onTimeout

Fires when no phrase finish event is received before time out. The event halts the recognition process automatically.

| Syntax: | |
|---|---|
| Inline HTML | <DTMF onTimeout="handler" . . . > |
| Event property (in ECMAScript) | Object.onTimeout = handler<br>Object.onTimeout = GetRef("handler"); |
| Event Object Info: | |
| Bubbles | No |
| To invoke | No DTMF key stroke is detected within the timeout specified. |
| Default action | None |

Event Properties:

Although the event handler does not receive properties directly, the handler can query the event object for data.

5 CallControl Object

Represents the telephone interface (call, terminal, and connection) of the telephone voice browser. This object is as native as window object in a GUI browser. As such, the lifetime of the telephone object is the same as the browser instance itself. A voice browser for telephony instantiates the telephone object, one for each call. Users don't instantiate or dispose the object.

At this point, only features related to first-party call controls are exposed through this object.

5.1 Properties
  address
    Read-only. XML DOM node object. Implementation specific. This is the address of the caller. For PSTN, may a combination of ANI and ALI. For VoIP, this is the caller's IP address.
  ringsBeforeAnswer
    Number of rings before answering an incoming call. Default is infinite, meaning the developer must specifically use the Answer( ) method below to answer the phone call. When the call center uses ACD to queue up the incoming phone calls, this number can be set to 0.

5.2 Methods
  Note: all the methods here are synchronous.

5.2.1 Transfer
  Transfers the call. For a blind transfer, the system may terminate the original call and free system resources once the transfer completes.
  Syntax:
    telephone.Transfer(strText);
  Parameters:
    strText: Required. The address of the intended receiver.
  Return value:
    None.
  Exception:
    Throws an exception when the call transfer fails. e.g., when end party is busy, no such number, fax or answering machine answers.

5.2.2 Bridge
  Third party transfer. After the call is transferred, the browser may release resources allocated for the call. It is up to the application to recover the session state when the transferred call returns using strUID. The underlying telephony platform may route the returning call to a different browser. The call can return only when the recipient terminates the call.
  Syntax:
    telephone.Bridge(strText, strUID, [imaxTime]);
  Parameters:
    strText: Required. The address of the intended receiver.
    strUID: Required. The session ID uniquely identifying the current call. When the transferred call is routed back, the srtUID will appear in the address attribute.
    imaxTime: Optional. Maximum duration in seconds of the transferred call. If unspecified, defaults to platform-internal value
  Return value:
    None.
  Exception:
    None.

5.2.3 Answer
  Answers the phone call.
  Syntax:
    telephone.Answer( );
  Return value:
    None.
  Exception:
    Throws an exception when there is no connection. No answer event will be fired in this case.

5.2.4 Hangup
  Terminates the phone call. Has no effect if no call currently in progress.
  Syntax:
    telephone.Hangup( );
  Return value:
    None.
  Exception:
    None.

5.2.5 Connect
  Starts a first-party outbound phone call.
  Syntax:
    telephone.Connect(strText, [iTimeout]);
  Parameters:
    strText: Required. The address of the intended receiver.
    iTimeout: Optional. The time in milliseconds before abandoning the attempt. If unspecified, defaults to platform-internal value.
  Return value:
    None.
  Exception:
    Throws an exception when the call cannot be completed, including encountering busy signals or reaching a FAX or answering machine (Note: hardware may not support this feature).

5.2.6 Record

Record user audio to file.

Syntax:

telephone.Record(url, endSilence, [maxTimeout], [initialTimeout]);

Parameters:

url: Required. The url of the recorded results.

endSilence: Required. Time in milliseconds to stop recording after silence is detected.

maxTimeout: Optional. The maximum time in seconds for the recording. Default is platform-specific.

initialTimeout: Optional. Maximum time (in milliseconds) of silence allowed at the beginning of a recording.

Return value:

None.

Exception:

Throws an exception when the recording can not be written to the url.

5.3 Event Handlers

App developers using telephone voice browser may implement the following event handlers.

5.3.1 onIncoming( )

Called when the voice browser receives an incoming phone call. All developers can use this handler to read caller's address and invoke customized features before answering the phone call.

5.3.2 onAnswer( )

Called when the voice browser answers an incoming phone call.

5.3.3 onHangup( )

Called when user hangs up the phone. This event is NOT automatically fired when the program calls the Hangup or Transfer methods.

5.4 Example

This example shows scripting wired to the call control events to manipulate the telephony session.

```
<HTML>
<HEAD>
<TITLE>Logon Page</TITLE>
</HEAD>
    <SCRIPT>
    var focus;
    function RunSpeech( ) {
        if (logon.user.value == "") {
            focus="user";
            p_uid.Start( ); g_login.Start( );
        dtmf.Start( ); return;
        }
        if (logon.pass.value == "") {
            focus="pin";
            p_pin.Start( ); g_login.Start( );
        dtmf.Start( ); return;
        }
        p_thank.Start( ); logon.submit( );
    }
    function login_reco( ) {
      res = event.srcElement.recoResult;
      pNode = res.selectSingleNode("//uid");
      if (pNode != null)
        logon.user.value = pNode.xml;
      pNode = res.selectSingleNode("//password");
      if (pNode != null)
        logon.pass.value = pNode.xml;
    }
    function dtmf_reco( ) {
      res = event.srcElement.dtmfResult;
      if (focus == "user")
        logon.user.value = res;
      else
        logon.pin.value = res;
    }
    </SCRIPT>
<SCRIPT for="callControl" event ="onIncoming">
<!--
    // read address, prepare customized stuff if
any
    callControl.Answer( );
//
</SCRIPT>
<SCRIPT for="callControl" event="onOffhook">
<!--
    p_main.Start( ); g_login.Start( ); dtmf.Start( );
    focus="user";
//
</SCRIPT>
<SCRIPT for="window" event ="onload">
<!--
    if (logon.user.value != "") {
        p_retry.Start( );
        logon.user.value = "";
        logon.pass.value = "";
        checkFields( );
    }
//
</SCRIPT>
<BODY>
<reco id="g_login"
    onReco="login_reco( ); runSpeech( )"
    timeout="5000"
    onTimeout="p_miss.Start( ); RunSpeech( )" >
    <grammar
src=http://kokanee1/etrademo/speechonly/login.xml/>
    </ reco >
<dtmf id="dtmf"
    escape="#"
    onkeypress="g_login.Stop( );"
    onReco="dtmf_reco( ); RunSpeech( )"
    interdigitTimeout="5000"
    onTimeout="dtmf.Flush( );
    p_miss.Start( ); RunSpeech( )" />
<prompt id="p_main">Please say your user I D and pin number</prompt>
<prompt id="p_uid">Please just say your user I D</prompt>
<prompt id="p_pin">Please just say your pin number</prompt>
<prompt id="p_miss">Sorry, I missed that</prompt>
<prompt id="p_thank">Thank you. Please wait while I verify your identity</prompt>
<prompt id="p_retry">Sorry, your user I D and pin number do not match</prompt>
<H2>Login</H2>
<form id="logon">
    UID: <input name="user" type="text"
    onChange="runSpeech( )" />
    PIN: <input name="pass" type="password"
    onChange="RunSpeech( )" />
</form>
</BODY>
</HTML>
```

6 Controlling Dialog Flow

6.1 Using HTML and Script to Implement Dialog Flow

This example shows how to implement a simple dialog flow which seeks values for input boxes and offers context-sensitive help for the input. It uses the title attribute on the HTML input mechanisms (used in a visual browser as a "tooltip" mechanism) to help form the content of the help prompt.

```
<html>
<title>Context Sensitive Help</title>
<head>
<script> var focus;
    function RunSpeech( ) {
        if (trade.stock.value == "") {
            focus="trade.stock";
            p_stock.Start( );
            return;
        }
        if (trade.op.value == "") {
            focus="trade.op";
            p_op.Start( );
            return;
        }
        //.. repeat above for all fields
        trade.submit( );
    }
    function handle( ) {
        res = event.srcElement.recoResult;
        if (res.text == "help") {
            text = "Please just say";
            text += document.all[focus].title;
            p_help.Start(text);
        } else {
            // proceed with value assignments
        }
    }
</script>
</head>
<body>
<prompt id="p_help" onComplete="checkFileds( )" />
<prompt id="p_stock"
onComplete="g_stock.Start( )">Please say the stock
name</prompt>
<prompt id="p_op" onComplete="g_op.Start( )">Do you
want to buy or sell</prompt>
<prompt id="p_quantity"
onComplete="g_quantity.Start( )">How many
shares?</prompt>
<prompt id="p_price"
onComplete="g_price.Start( )">What's the price</prompt>
<reco id="g_stock" onReco="handle( ); checkFields( )" >
    <grammar src="./g_stock.xml" />
</ reco >
<reco id="g_op" onReco="handle( ); checkFields( )" />
    <grammar src="./g_op.xml" />
</ reco >
<reco id="g_quantity" onReco="handle( ); checkFields( )"
/>
    <grammar src="./g_quant.xml" />
</ reco >
<reco id="g_price" onReco="handle( ); checkFields( )" />
    <grammar src="./g_quant.xml" />
</ reco >
<form id="trade">
    <input name="stock" title="stock name" />
    <select name="op" title="buy or sell">
        <option value="buy" />
        <option value="sell" />
    </select>
    <input name ="quantity" title="number of shares"
/>
    <input name= "price" title="price" />
</form>
</body>
</html>
6.2 Using SMIL
The following example shows activation of prompt and
reco elements using SMIL mechanisms.
    <html xmlns:t="urn:schemas-microsoft-com:time"
        xmlns:sp="urn:schemas-microsoft-
com:speech">
    <head>
    <style>
    .time { behavior: url(#default#time2); }
    </style>
    </head>
    <body>
    <input name="txtBoxOrigin" type="text"/>
    <input name="txtBoxDest" type="text" />
    <sp:prompt class="time" t:begin="0">
        Please say the origin and destination cities
    </sp:prompt>
    <t:par t:begin="time.end"
    t:repeatCount="indefinitely"
    <sp:reco class="time" >
        <grammar src="./city.xml" />
        <bind targetElement="txtBoxOrigin"
        value="//origin_city" />
        <bind targetElement="txtBoxDest"
        test="/sml/dest_city[@confidence $gt$ 40]"
        value="//dest_city" />
    </sp:reco>
    </t:par>
    </body>
</html>
```

APPENDIX B

1 QA Speech Control

The QA control adds speech functionality to the primary control to which it is attached. Its object model is an abstraction of the content model of the exemplary tags in Appendix A.

1.1 QA Control

```
<Speech:QA
    id="..."
    controlsToSpeechEnable="..."
    speechIndex="..."
    ClientTest="..."
    runat="server" >
    <Question ...>
    <Statement ...>
    ...
    <Answer ...>
    <Confirm ...>
    ...
    <Command ...>
    ...
</Speech:QA>
```

1.1.1 Core Properties

String ControlsToSpeechEnable

ControlsToSpeechEnable specifies the list of IDs of the primary controls to speech enable. IDs are comma delimited.

1.1.2 Activation Mechanisms

Int SpeechIndex

SpeechIndex specifies the ordering information of the QA control—this is used by RunSpeech. Note: If more than one QA control has the same SpeechIndex, RunSpeech will execute them in source order. In situations where some QA controls have SpeechIndex specified and some QA controls do not, RunSpeech will order the QA controls first by SpeechIndex, then by source order, String ClientTest ClientTest specifies a client-side script function which returns a boolean value to determine when the QA control is considered available for selection by the RunSpeech algorithm. The system strategy can therefore be changed by using this as a condition to activate or de-activate QA controls more sensitively than SpeechIndex. If not specified, the QA control is considered available for activation.

1.1.3 Questions, Statements, Answers, Confirms and Commands

Question[ ] Questions

QA control contains an array of question objects or controls, defined by the dialog author. Each question control will typically relate to a function of the system, eg asking for a value, etc. Each question control may specify an activation function using the ClientTest attribute, so an active QA control may ask different kinds of questions about its primary control under different circumstances. For example, the activation condition for main question Q_Main may be that the corresponding primary control has no value, and the activation condition for a Q_GiveHelp may be that the user has just requested help. Each Question may specify answer controlss from within the QA control which are activated when the question control is outputted.

Statement[ ] Statement

QA control contains an array of statement objects or controls. Statements are used to provide information to the listener, such as welcome prompts.

Answer[ ] Answers

QA control contains an array of answer objects or controls. An answer control is activated directly by a question control within the QA control, or by a StartEvent from the Primary control. Where multiple answers are used, they will typically reflect answers to the system functions, e.g. A_Main might provide a value in response to Q_Main, and A_Confirm might providing a yes/no+correction to Confirm.

Confirm[ ] Confirm

QA control may contain a confirm object or control. This object is a mechanism provided to the dialog authors which simplify the authoring of common confirmation subdialogs.

Command[ ] Command

A Command array holds a set of command controls. Command controls can be thought of as answer controls without question controls, whose behavior on recognition can be scoped down the control tree.

1.2 Question Control

The question control is used for the speech output relating to a given primary control. It contains a set of prompts for presenting information or asking a question, and a list of ids of the answer controls, which may provide an answer to that question. If multiple answer controls are specified, these grammars are loaded in parallel when the question is activated. An exception will be thrown if no answer control is specified in the question control.

```
<Question
    id="..."
    ClientTest="..."
    Answers="..."
    Count="..."
    initialTimeout="..."
    babbleTimeout="..."
    maxTimeout="..."
    Modal="..."
    PromptFunction="..."
    OnClientNoReco="..." >
    <prompt ... />
    ...
</Question>
```

String ClientTest

ClientTest specifies the client-side script function returning a boolean value which determines under which circumstances a question control is considered active within its QA control (the QA control itself must be active for the question to be evaluated). For a given QA control, the first question control with a true condition is selected for output. For example, the function may be used to determine whether to output a question which asks for a value ("Which city do you want?") or which attempts to confirm it ("Did you say London?"). If not specified, the question condition is considered true.

Prompt[ ] Prompts

The prompt array specifies a list of prompt objects, discussed below. Prompts are also able to specify conditions of selection (via client functions), and during RunSpeech execution only the first prompt with a true condition is selected for playback.

String Answers

Answers is an array of references by ID to controls that are possible answers to the question. The behavior is to activate the grammar from each valid answer control in response to the prompt asked by the question control.

Integer initialTimeout

The time in milliseconds between start of recognition and the detection of speech. This value is passed to the recognition platform, and if exceeded, an on Silence event will be thrown from the recognition platform. If not specified, the speech platform will use a default value.

Integer babbleTimeout

The period of time in milliseconds in which the recognition server or other recognizer must return a result after detection of speech. For recos in "tap-and-talk" scenarios this applies to the period between speech detection and the recognition result becoming available. For recos in dictation scenarios, this timeout applies to the period between speech detection and each recognition return—i.e. the period is restarted after each return of results or other event. If exceeded, the on ClientNoReco event is thrown but different status codes are possible. If there has been any kind of recognition platform error that is detectable and the babbleTimeout period has elapsed, then an on ClientNoReco is thrown but with a status code −3. Otherwise if the recognizer is still processing audio—e.g. in the case of an exceptionally long utterance or if the user has kept the pen down for an excessive amount of time—the on ClientNoReco event is thrown, with status code −15. If babbleTimeout is not specified, the speech platform will default to an internal value.

Integer maxTimeout

The period of time in milliseconds between recognition start and results returned to the client device browser. If exceeded, the on MaxTimeout event is thrown by the browser—this caters for network or recognizer failure in distributed environments. For recos in dictation scenarios, as with babbleTimeout, the period is restarted after the return of each recognition or other event. Note that the maxTimeout attribute should be greater than or equal to the sum of initialTimeout and babbleTimeout. If not specified, the value will be a browser default.

Bool Modal

When modal is set to true, no answers except the immediate set of answers to the question are activated (i.e. no scoped Answers are considered). The defaults is false. For Example, this attribute allows the application developer to force the user of the client device to answer a particular question.

String PromptFunction(Prompt)

PromptFunction specifies a client-side function that will be called once the question has been selected but before the prompt is played. This gives a chance to the application developer to perform last minute modifications to the prompt that may be required. PromptFunction takes the ID of the target prompt as a required parameter, String OnClientNoReco OnClientNoReco specifies the name of the client-side function to call when the NoReco (mumble) event is received.

1.2.1 Prompt Object

The prompt object contains information on how to play prompts. All the properties defined are read/write properties.

```
<prompt
    id="..."
    count="..."
    ClientTest="..."
    source="..."
    bargeIn="..."
    onClientBargein="..."
    onClientComplete="..."
    onClientBookmark="..." >
    ... text/markup of the prompt ...
</prompt>
```

Int Count

Count specifies an integer which is used for prompt selection. When the value of the count specified on a prompt matches the value of the count of its question control, the prompt is selected for playback. Legal values are 0-100.

```
<Question id=Q_Ask">
    <prompt count="1"> Hello </prompt>
    <prompt count="2"> Hello again </prompt>
</Question>
```

In the example, when Q_Ask.count is equal to 1, the first prompt is played, and if it is equal to 2 (i.e. the question has already been output before), the second prompt is then played, String ClientTest ClientTest specifies the client-side script function returning a boolean value which determines under which circumstances a prompt within an active question control will be selected for output. For a given question control, the first prompt with a true condition is selected. For example, the function may be used to implement prompt tapering, eg ("Which city would you like to depart from?" for a function returning true if the user if a first-timer, or "Which city?" for an old hand). If not specified, the prompt's condition is considered true.

String InlinePrompt

The prompt property contains the text of the prompt to play. This is defined as the content of the prompt element. It may contain further markup, as in TTS rendering information, or <value> elements. As with all parts of the page, it may also be specified as script code within <script> tags, for dynamic rendering of prompt output.

String Source

Source specifies the URL from which to retrieve the text of the prompt to play. If an inline prompt is specified, this property is ignored.

Bool BargeIn

BargeIn is used to specify whether or not barge-in (wherein the user of the client device begins speaking when a prompt is being played) is allowed on the prompt. The defaults is true.

String onClientBargein onClientBargein specifies the client-side script function which is invoked by the bargein event.

string onClientComplete onClientComplete specifies the client-side script function which is invoked when the playing of the prompt has competed.

string OnClientBookmark

OnClientBookmark accesses the name of the client-side function to call when a bookmark is encountered.

1.2.2 Prompt Selection

On execution by RunSpeech, a QA control selects its prompt in the following way:

ClientTest and the count attribute of each prompt are evaluated in order. The first prompt with both ClientTest and count true is played. A missing count is considered true. A missing ClientTest is considered true.

1.3 Statement Control Statement controls are used for information-giving system output when the activation of grammars is not required. This is common in voice-only dialogs. Statements are played only once per page if the playOnce attribute is true.

```
<Statement
    id="..."
    playOnce="..."
    ClientTest="..."
    PromptFunction="..." >
    <prompt ... />
    ...
</Statement>
```

Bool playOnce

The playOnce attribute specifies whether or not a statement control may be activated more than once per page, playOnce is a Boolean attribute with a default (if not specified) of TRUE, i.e., the statement control is executed only once. For example, the playOnce attribute may be used on statement controls whose purpose is to output email messages to the end user. Setting playOnce="False" will provide dialog authors with the capability to enable a "repeat" functionality on a page that reads email messages.

String ClientTest

ClientTest specifies the client-side script function returning a boolean value which determines under which circumstances a statement control will be selected for output. RunSpeech will activate the first Statement with ClientTest equal to true. If not specified, the ClientTest condition is considered true.

String PromptFunction

PromptFunction specifies a client-side function that will be called once the statement control has been selected but before the prompt is played. This gives a chance to the authors to do last minute modifications to the prompt that may be required.

Prompt[ ] Prompt

The prompt array specifies a list of prompt objects. Prompts are also able to specify conditions of selection (via client functions), and during RunSpeech execution only the first prompt with a true condition is selected for playback.

```
<Speech:QA
    id="QA_Welcome"
    ControlsToSpeechEnable="Label1"
    runat="server" >
    <Statement id="WelcomePrompt" >
        <prompt bargeIn="False"> Welcome </prompt>
    </Statement>
</Speech:QA>
```

1.4 Confirm Control

Confirm controls are special types of question controls. They may hold all the properties and objects of other questions controls, but they are activated differently. The Run- Speech algorithm will check the confidence score found in the confirmThreshold of the answer control of the ControlsToSpeechEnable. If it is too low, the confirm control is activated. If the confidence score of the answer control is below the confirmThreshold, then the binding is done but the onClientReco method is not called. The dialog author may specify more than one confirm control per QA control. RunSpeech will determine which confirm control to activate based on the function specified by ClientTest.

```
<Answer ConfirmThreshold=... />
<Confirm>
    ... all attributes and objects of Question ...
</Confirm>
```

1.5 Answer Control

The answer control is used to specify speech input resources and features. It contains a set of grammars related to the primary control. Note that an answer may be used independently of a question, in multimodal applications without prompts, for example, or in telephony applications where user initiative may be enabled by extra-answers. Answer controls are activated directly by question controls, by a triggering event, or by virtue of explicit scope. An exception will be thrown if no grammar object is specified in the answer control.

```
<Answer
    id="..."
    scope="..."
    StartEvent="..."
    StopEvent="..."
    ClientTest="..."
    onClientReco="..."
    onClientDTMF="..."
    autobind="..."
    server="..."
    ConfirmThreshold="..."
    RejectThreshold="..." >
    <grammar .../>
    <grammar .../>
    ...
    <dtmf .../>
    <dtmf .../>
    ...
    <bind .../>
    <bind .../>
    ...
</Answer>
```

String Scope

Scope holds the id of any named element on the page. Scope is used in answer control for scoping the availability of user initiative (mixed task initiative: i.e. service jump digressions) grammars. If scope is specified in an answer control, then it will be activated whenever a QA control corresponding to a primary control within the subtree of the contextual control is activated.

String StartEvent

StartEvent specifies the name of the event from the primary control that will activate the answer control (start the Reco object). This will be typically used in multi-modal applications, eg onMouseDown, for tap-and-talk.

String StopEvent

StopEvent specifies the name of the event from the primary control that will de-activate the answer control (stop the Reco object). This will be typically used in multi-modal applications, eg onMouseUp, for tap-and-talk.

String ClientTest

ClientTest specifies the client-side script function returning a boolean value which determines under which circumstances an answer control otherwise selected by scope or by a question control will be considered active. For example, the test could be used during confirmation for a 'correction' answer control to disable itself when activated by a question control, but mixed initiative is not desired (leaving only accept/deny answers controls active). Or a scoped answer control which permits a service jump can determine more flexible means of activation by specifying a test which is true or false depending on another part of the dialog. If not specified, the answer control's condition is considered true.

Grammar[ ] Grammars

Grammars accesses a list of grammar objects.

DTMF[ ] DTMFs

DTMFs holds an array of DTMF objects.

Bind[ ] Binds

Binds holds a list of the bind objects necessary to map the answer control grammar results (dtmf or spoken) into control values. All binds specified for an answer will be executed when the relevant output is recognized. If no bind is specified, the SML output returned by recognition will be bound to the control specified in the ControlsToSpeechEnable of the QA control String OnClientReco OnClientReco specifies the name of the client-side function to call when spoken recognition results become available, String OnClientDTMF OnClientDTMF holds the name of the client-side function to call when DTMF recognition results become available, Boolean Autobind The value of autobind determines whether or not the system default bindings are implemented for a recognition return from the answer control. If unspecified, the default is true. Setting autobind to false is an instruction to the system not to perform the automatic binding.

String Server

The server attribute is an optional attribute specifying the URI of the speech server to perform the recognition. This attribute over-rides the URI of the global speech server attribute.

Integer ConfirmThreshold

Holds a value representing the confidence level below which a confirm control question will be automatically triggered immediately after an answer is recognized within the QA control. Legal values are 0-100.

Note that where bind statements and on ClientReco scripts are both specified, the semantics of the resulting Tags are that binds are implemented before the script specified in onClientReco.

Integer RejectThreshold

RejectThreshold specifies the minimum confidence score to consider returning a recognized utterance. If overall confidence is below this level, a NoReco event will be thrown. Legal values are 0-100.

1.5.1 Grammar

The grammar object contains information on the selection and content of grammars, and the means for processing recognition results. All the properties defined are read/write properties.

```
<Grammar
    ClientTest="..."
    Source="..."
```

-continued

```
    >
        ... grammar rules ...
    </Grammar>
```

String ClientTest

The ClientTest property references a client-side boolean function which determines under which conditions a grammar is active. If multiple grammars are specified within an answer control (e.g. to implement a system/mixed initiative strategy, or to reduce the perplexity of possible answers when the dialog is going badly), only the first grammar with a true ClientTest function will be selected for activation during RunSpeech execution. If this property is unspecified, true is assumed.

String Source

Source accesses the URI of the grammar to load, if specified.

String InlineGrammar

InlineGrammar accesses the text of the grammar if specified inline. If that property is not empty, the Source attribute is ignored.

1.5.2 Bind

The object model for bind follows closely its counterpart client side tags. Binds may be specified both for spoken grammar and for DTMF recognition returns in a single answer control.

```
    <bind
        Value="..."
        TargetElement="..."
        TargetAttribute="..."
        Test="..."
    />
```

String Value

Value specifies the text that will be bound into the target element. It is specified as an XPath on the SML output from recognition.

String TargetElement

TargetElement specifies the id of the primary control to which the bind statement applies. If not specified, this is assumed to be the ControlsToSpeechEnable of the relevant QA control.

String TargetAttribute

TargetAttribute specifies the attribute on the TargetElement control in which bind the value. If not specified, this is assumed to be the Text property of the target element.

String Test

The Test attribute specifies a condition which must evaluate to true on the binding mechanism. This is specified as an XML Pattern on the SML output from recognition.

1.5.2.1 Automatic Binding

The default behavior on the recognition return to a speech-enabled primary control is to bind certain properties into that primary control. This is useful for the dialog controls to examine the recognition results from the primary controls across turns (and even pages). Answer controls will perform the following actions upon receiving recognition results:
  1. bind the SML output tree into the SML attribute of the primary control
  2. bind the text of the utterance into the SpokenText attribute of the primary control
  3. bind the confidence score returned by the recognizer into the Confidence attribute of the primary control.

Unless autobind="False" attribute is specified on an answer control, the answer control will perform the following actions on the primary control:
  1. bind the SML output tree into the SML attribute;
  2. bind the text of the utterance into the SpokenText attribute;
  3. bind the confidence score returned by the recognizer into the Confidence attribute;

Any values already held in the attribute will be overwritten. Automatic binding occurs before any author-specified bind commands, and hence before any on ClientReco script (which may also bind to these properties).

1.5.3 DTMF

DTMF may be used by answer controls in telephony applications. The DTMF object essentially applies a different modality of grammar (a keypad input grammar rather than a speech input grammar) to the same answer. The DTMF content model closely matches that of the client side output Tags DTMF element. Binding mechanisms for DTMF returns are specified using the targetAttribute attribute of DTMF object.

```
    <DTMF
        firstTimeOut="..."
        interDigitTimeOut="..."
        numDigits="..."
        flush="..."
        escape="..."
        targetAttribute="..."
        ClientTest="...">
        <dtmf Grammar ...>
    </DTMF>
```

Integer firstTimeOut

The number of milliseconds to wait between activation and the first key press before raising a timeout event, Integer interDigitTimeOut The number of milliseconds to wait between key presses before raising a timeout event.

Int numDigits

The maximum number of key inputs permitted during DTMF recognition.

Bool Flush

A flag which states whether or not to flush the telephony server's DTMF buffer before recognition begins. Setting flush to false permits DTMF key input to be stored between recognition/page calls, which permits the user to 'type-ahead'.

String Escape

Holds the string value of the key which will be used to end DTMF recognition (eg '#').

String targetAttribute

TargetAttribute specifies the property on the primary control in which to bind the value. If not specified, this is assumed to be the Text property of the primary control.

String ClientTest

The ClientTest property references a client-side boolean function which determines under which conditions a DTMF grammar is active. If multiple grammars are specified within a DTMF object, only the first grammar with a true ClientTest function will be selected for activation during RunSpeech execution. If this property is unspecified, true is assumed.

1.5.4 DTMFGrammar

DTMFGrammar maps a key to an output value associated with the key. The following sample shows how to map the "1" and "2" keys to text output values.

```
<dtmfgrammar>
    <key value="1">Seattle</key>
    <key value="2">Boston</key>
</dtmfgrammar>
```

1.6 Command Control

The command control is a special variation of answer control which can be defined in any QA control. Command controls are forms of user input which are not answers to the question at hand (eg, Help, Repeat, Cancel), and which do not need to bind recognition results into primary controls. If the QA control specifies an activation scope, the command grammar is active for every QA control within that scope. Hence a command does not need to be activated directly by a question control or an event, and its grammars are activated in parallel independently of answer controls building process. Command controls of the same type at QA controls lower in scope can override superior commands with context-sensitive behavior (and even different/extended grammars if necessary).

```
<Command
    id="..."
    scope="..."
    type="..."
    RejectThreshold="..."
    onClientReco="..." >
    <Grammar...>
    <dtmf...>
    ...
</Command>
```

String Scope

Scope holds the id of a primary control. Scope is used in command controls for scoping the availability of the command grammars. If scope is specified for a command control, the command's grammars will be activated whenever a QA control corresponding to a primary control within the subtree of the contextual control is activated.

String Type

Type specifies the type of command (eg 'help', 'cancel' etc.) in order to allow the overriding of identically typed commands at lower levels of the scope tree. Any string value is possible in this attribute, so it is up to the author to ensure that types are used correctly.

Integer RejectThreshold

RejectThreshold specifies the minimum confidence level of recognition that is necessary to trigger the command in recognition (this is likely to be used when higher than usual confidence is required, eg before executing the result of a 'Cancel' command). Legal values are 0-100.

String onClientReco onCommand specifies the client-side script function to execute on recognition of the command control's grammar.

Grammar Grammar

The grammar object which will listen for the command.

DTMF DTMF

The dtmf object which will activate the command.

2 Types of Initiatives and Dialog Flows

Using the control described above, various forms of initiatives can be developed, some examples are provided below:

2.1 Mixed initiative Dialogs

Mixed initiative dialogs provide the capability of accepting input for multiple controls with the asking of a single question. For example, the answer to the question "what are your travel plans" may provide values for an origin city textbox control, a destination city textbox control and a calendar control ("Fly from Puyallup to Yakima on September $30^{th}$")

A robust way to encode mixed initiative dialogs is to handwrite the mixed initiative grammar and relevant binding statements, and apply these to a single control.

The following example shows a single page used for a simple mixed initiative voice interaction about travel. The first QA control specifies the mixed initiative grammar and binding, and a relevant prompt asking for two items. The second and third QA controls are not mixed initiative, and so bind directly to their respective primary control by default (so no bind statements are required). The RunSpeech algorithm will select the QA controls based on an attribute "SpeechIndex" and whether or not their primary controls hold valid values.

```
<%@ Page language="c#" AutoEventWireup="false"
inherits="SDN.Page" %>
<%@Register tagPrefix="SDN" Namespace="SDN" Assembly="SDN"
%>
<html>
<body>
<Form id="WebForm1" method=post runat="server">
<ASP:Label id="Label1" runat="server">Departure
city</ASP:Label>
<ASP:TextBox id="TextBox1" runat="server" />
<br>
<ASP:Label id="Label2" runat="server">Arrival
city</ASP:Label>
<ASP:TextBox id="TextBox2" textchanged="TextChanged"
runat="server" />
<!--speech information -->
<Speech:QA id="QAmixed" controlsToSpeechEnable="TextBox1"
speechIndex="1" runat="server">
    <Question id="Q1" Answers="A1">
        <prompt>"Please say the cities you want to fly
from and to"</prompt>
    </Question>
    <Answer id="A1" >
        <grammar src="..." />
        <bind targetElement="TextBox1"
value="/sml/path1"/>
        <bind targetElement="TextBox2"
value="/sml/path2"/>
    </Answer>
</Speech:QA>
<Speech:QA id="QA1" controlsToSpeechEnable="TextBox1"
speechIndex="2" runat="server">
    <Question id="Q1" Answers="A1">
        <prompt>"What's the departure city?"</prompt>
    </Question>
    <Answer id="A1">
        <grammar src="..."/>
    </Answer>
</Speech:QA>
<Speech:QA id="QA2" controlsToSpeechEnable="TextBox2"
speechIndex="3" runat="server">
    <Question id="Q1" Answer="A1">
        <prompt>"What's the arrival city"</prompt>
    </Question>
    <Answer id="A1">
        <grammar src="..."/>
    </Answer>
</Speech:QA>
</Form>
</body>
</html>
```

2.2 Complex Mixed Initiative

Application developers can specify several answer to the same question control with different levels of initiatives. Conditions are specified that will select one of the answers when the question is asked, depending on the initiative settings that they require. An example is provided below:

```
<Speech:QA
    id="QA_Panel2"
    ControlsToSpeechEnable="Panel2"
    runat="server" >
        <Question                answers="systemInitiative,
mixedInitiative" . . . />
        <Answer    id="systemInitiative"
                   ClientTest="systemInitiativeCond"
                   onClientReco="SimpleUpdate" >
                   <grammar src="systemInitiative.gram" />
        </Answer>
        <Answer    id="mixedInitiative"
                   ClientTest="mixedInitiativeCond"
                   onClientReco="MixedUpdate" >
                   <grammar src="mixedInitiative.gram" />
        </Answer>
</Speech:QA>
```

Application developers can also specify several question controls in a QA control. Some question controls can allow a mixed initiative style of answer, whilst others are more directed. By authoring conditions on these question controls, application developer can select between the questions depending on the dialogue situation.

In the following example the mixed initiative question asks the value of the two textboxes at the same time (e.g., 'what are your travel plans?') and calls the mixed initiative answer (e.g., 'from London to Seattle'). If this fails, then the value of each textbox is asked separately (e.g., 'where do you leave from' and 'where are you going to') but, depending on the conditions, the mixed-initiative grammar may still be activated, thus allowing users to provide both values.

```
<Speech:QA
    id="QA_Panel2"
    ControlsToSpeechEnable="TextBox1, TextBox2"
    runat="server" >
        <Question
            ClientTest="AllEmpty( )"
            answers="AnsAll"
            . . . />
        <Question
            ClientTest="TextBox1IsEmpty( )"
            answers="AnsAll, AnsTextBox1" . . . />
        <Question
            ClientTest="TextBox2IsEmpty( )"
            answers="AnsAll, AnsTextBox2" . . . />
        <Answer
            id="AnsTextBox1"
            onClientReco="SimpleUpdate">
            <grammar src="AnsTextBox1.gram" />
        </Answer>
        <Answer
            id="AnsTextBox2"
            onClientReco="SimpleUpdate" >
            <grammar src=" AnsTextBox2.gram" />
        </Answer>
        <Answer
            id="AnsAll"
            ClientTest="IsMixedInitAllowed( )"
            onClientReco="MixedUpdate"
        >
            <grammar src="AnsAll.gram" />
        </Answer>
</Speech:QA>
```

2.3 User initiative

Similar to the command control, a standard QA control can specify a scope for the activation of its grammars. Like a command control, this QA control will activate the grammar from a relevant answer control whenever another QA control is activated within the scope of this context. Note that its question control will only be asked if the QA control itself is activated.

```
<Speech:QA
    id="QA_Panel2"
    ControlsToSpeechEnable="Panel2"
    runat="server" >
        <Question . . . />
        <Answer       id="AnswerPanel2"
                      scope="Panel2"
                      onClientReco="UpdatePanel2( )" >
            <grammar src="Panel2.gram" />
        </Answer>
</Speech:QA>
```

This is useful for dialogs which allow 'service jumping'—user responses about some part of the dialog which is not directly related to the question control at hand.

2.4 Short Time-Out Confirms

Application developers can write a confirmation as usual but set a short time-out. In the timeout handler, code is provided to that accept the current value as exact.

```
<Speech:QA
    id="QA_Panel2"
    ControlsToSpeechEnable="Panel2"
    runat="server" >
        <Confirm timeOut="20"
onClientTimeOut="AcceptConfirmation" . . . />
        <Answer     id="CorrectPanel2"
                    onClientReco="UpdatePanel2( )" >
            <grammar src="Panel2.gram" />
        </Answer>
</Speech:QA>
```

2.5 Dynamic Prompt Building and Editing

The promptFunction script is called after a question control is selected but before a prompt is chosen and played. This lets application developers build or modify the prompt at the last minute. In the example below, this is used to change the prompt depending on the level of experience of the users.

```
<script language=javascript>
    function GetPrompt( )    {
        if(experiencedUser == true)
            Prompt1.Text =  "What service do you want?";
        else
            Prompt1.Text =  "Please choose between e-mail,
                            calendar and news" ;
        return;
    }
</script>
<Speech:QA
    id="QA_Panel2"
    ControlsToSpeechEnable="Panel2"
    runat="server" >
        <Question PromptFunction="GetPrompt" . . . >
            <Prompt id="Prompt1" />
        </Question>
        <Answer . . . />
</Speech:QA>
```

2.6 Using Semantic Relationships

Recognition and use of semantic relationships can be done by studying the result of the recognizer inside the on Reco event handler.

```
<script language="javascript">
function Reco( ) {
/*
```

Application developers can access the SML returned by the recogniser or recognition server. If a semantic relationship (like sport-news) is identified, the confidence of the individual elements can be increased or take any other appropriate action.

```
*/
}
</script>
<Speech:QA
    id="QA_Panel2"
    ControlsToSpeechEnable="Panel2"
    runat="server" >
<Question . . . />
<Answer onClientReco="Reco" >
        <grammar src="Panel2.gram" />
    </Answer>
</Speech:QA>
```

3 Implementation and Application of RunSpeech

A mechanism is needed to provide voice-only clients with the information necessary to properly render speech-enabled pages. Such a mechanism must provide the execution of dialog logic and maintain state of user prompting and grammar activation as specified by the application developer.

Such a mechanism is not needed for multimodal clients. In the multimodal case, the page containing speech-enabled controls is visible to the user of the client device. The user of the client device may provide speech input into any visible speech-enabled control in any desired order using the a multimodal paradigm.

The mechanism used by voice-only clients to render speech-enabled pages is the RunSpeech script or algorithm. The RunSpeech script relies upon the SpeechIndex attribute of the QA control and the SpeechGroup control discussed below.

3.1 SpeechControl

During run time, the system parses a control script or webpage having the server controls and creates a tree structure of server controls. Normally the root of the tree is the Page control. If the control script uses custom or user control, the children tree of this custom or user control is expanded. Every node in the tree has an ID and it is easy to have name conflict in the tree when it expands. To deal with possible name conflict, the system includes a concept of NamingContainer. Any node in the tree can implement NamingContainer and its children lives within that name space.

The QA controls can appear anywhere in the server control tree. In order to easily deal with SpeechIndex and manage client side rendering, a SpeechGroup control is provided. The Speechgroup control is hidden from application developer.

One SpeechGroup control is created and logically attached to every NamingContainer node that contain QA controls in its children tree. QA and SpeechGroup controls are considered members of its direct NamingContainer's SpeechGroup. The top level SpeechGroup control is attached to the Page object. This membership logically constructs a tree—a logical speech tree—of QA controls and SpeechGroup controls.

For simple speech-enabled pages or script (i.e., pages that do not contain other NamingContainers), only the root SpeechGroup control is generated and placed in the page's server control tree before the page is sent to the voice-only client. The SpeechGroup control maintains information regarding the number and rendering order of QA controls on the page.

For pages containing a combination of QA control(s) and NamingContainer(s), multiple SpeechGroup controls are generated: one SpeechGroup control for the page (as described above) and a SpeechGroup control for each NamingContainer. For a page containing NamingContainers, the page-level SpeechGroup control maintains QA control information as described above as well as number and rendering order of composite controls. The SpeechGroup control associated with each NamingContainer maintains the number and rendering order of QAs within each composite.

The main job of the SpeechGroup control is to maintain the list of QA controls and SpeechGroups on each page and/or the list of QA controls comprising a composite control. When the client side markup script (e.g. HTML) is generated, each SpeechGroup writes out a QACollection object on the client side. A QACollection has a list of QA controls and QACollections. This corresponds to the logical server side speech tree. The RunSpeech script will query the page-level QACollection object for the next QA control to invoke during voice-only dialog processing.

The page level SpeechGroup control located on each page is also responsible for:

Determining that the requesting client is a voice-only client; and

Generating common script and supporting structures for all QA controls on each page.

When the first SpeechGroup control renders, it queries the System.Web.UI.Page.Request.Browser property for the browser string. This property is then passed to the RenderSpeechHTML and RenderSpeechScript methods for each QA control on the page. The QA control will then render for the appropriate client(multimodal or voice-only).

3.2 Creation of SpeechGroup Controls

During server-side page loading, the on Load event is sent to each control on the page. The page-level SpeechGroup control is created by the first QA control receiving the on Load event. The creation of SpeechGroup controls is done in the following manner: (assume a page containing composite controls)

Every QA control will receive on Load event from run time code. onLoad for a QA:

Get the QA's NamingContainer N1
Search for SpeechGroup in the N1's children
    If already exists, register QA control with this SpeechGroup, onLoad returns.
    If not found:
        Create a new SpeechGroup G1, inserts it into the N1's children
        If N1 is not Page, find N1's NamingContainer N2
        Search for SpeechGroup in N2's children, if exists, say G2, add G1 to G2. If not, create a new one G2, inserts in to N2's children
        Recursion until the NamingContainer is the Page (top level)

During server-side page rendering, the Render event is sent to the speech-enabled page. When the page-level SpeechGroup control receives the Render event, it generates client side script to include RunSpeech.js and inserts it into the page that is eventually sent to the client device. It also calls all its direct children to render speech related HTML and scripts. If a child is SpeechGroup, the child in turn calls its children again. In this manner, the server rendering happens along the server side logical speech tree.

When a SpeechGroup renders, it lets its children (which can be either QA or SpeechGroup) render speech HTML and scripts in the order of their SpeechIndex. But a SpeechGroup is hidden and doesn't naturally have a SpeechIndex. In fact, a SpeechGroup will have the same SpeechIndex as its NamingContainer, the one it attaches to. The NamingContainer is usually a UserControl or other visible control, and an author can set SpeechIndex to it.

3.3 RunSpeech

The purpose of RunSpeech is to permit dialog flow via logic which is specified in script or logic on the client. In one embodiment, RunSpeech is specified in an external script file, and loaded by a single line generated by the server-side rendering of the SpeechGroup control, e.g.:

<script language="javascript" src="/scripts/RunSpeech.js"/>

The RunSpeech.js script file should expose a means for validating on the client that the script has loaded correctly and has the right version id, etc. The actual validation script will be automatically generated by the page class as inline functions that are executed after the attempt to load the file.

Linking to an external script is functionally equivalent to specifying it inline, yet it is both more efficient, since browsers are able to cache the file, and cleaner, since the page is not cluttered with generic functions.

3.4 Events
3.4.1 Event wiring

Tap-and-talk multimodality can be enabled by coordinating the activation of grammars with the onMousepown event. The wiring script to do this will be generated by the Page based on the relationship between controls (as specified in the ControlsToSpeechEnable property of the QA control in).

For example, given an asp:TextBox and its companion QA control adding a grammar, the <input> and <reco> elements are output by each control's Render method. The wiring mechanism to add the grammar activation command is performed by client-side script generated by the Page, which changes the attribute of the primary control to add the activation command before any existing handler for the activation event:

```
<!-- Control output -->
<input id="TextBox1" type="text" ... />
<reco id="Reco1" ... />
    <grammar src=" ... " />
</reco>
<!-- Page output -->
<script>
    TextBox1.onMouseDown =
"Reco1.Start( ) ;"+TextBox1.onMouseDown;
</script>
```

By default, hook up is via onmousedown and onmouseup events, but both StartEvent and StopEvent can be set by web page author.

The textbox output remains independent of this modification and the event is processed as normal if other handlers were present.

3.4.2 Page Class Properties

The Page also contains the following properties which are available to the script at runtime:

SML—a name/value pair for the ID of the control and it's associated SML returned by recognition.

SpokenText—a name/value pair for the ID of the control and it's associated recognized utterance Confidence—a name/value pair for the ID of the control and it's associated confidence returned by the recognizer.

4 RunSpeech Algorithm

The RunSpeech algorithm is used to drive dialog flow on the client device. This may involve system prompting and dialog management (typically for voice-only dialogs), and/or processing of speech input (voice-only and multimodal dialogs). It is specified as a script file referenced by URI from every relevant speech-enabled page (equivalent to inline embedded script).

Rendering of the page for voice only browsers is done in the following manner:

The RunSpeech module or function works as follows (RunSpeech is called in response to document.onreadystate becoming "complete"):

(1) Find the first active QA control in speech index order (determining whether a QA control is active is explained below).
(2) If there is no active QA control, submit the page.
(3) Otherwise, run the QA control.

A QA control is considered active if and only if:
(1) The QA control's ClientTest either is not present or returns true, AND
(2) The QA control contains an active question control or statement control (tested in source order), AND
(3) Either:
  a. The QA control contains only statement controls, OR
  b. At least one of the controls referenced by the QA control's ControlsToSpeechEnable has an empty or default value.

A question control is considered active if and only if:
(1) The question control's ClientTest either is not present or returns true, AND
(2) The question control contains an active prompt object.

A prompt object is considered active if and only if:
(1) The prompt object's ClientTest either is not present or returns true, AND
(2) The prompt object's Count is either not present, or is less than or equal to the Count of the parent question control.

A QA control is run as follows:
(1) Determine which question control or statement control is active and increment its Count.
(2) If a statement control is active, play the prompt and exit.
(3) If a question control is active, play the prompt and start the Recos for each active answer control and command control.

An answer control is considered active if and only if:
(1) The answer control's ClientTest either is not present or returns true, AND
(2) Either:
  a. The answer control was referenced in the active question control's Answers string, OR
  b. The answer control is in Scope A command control is considered active if and only if:
(1) It is in Scope, AND
(2) There is not another command control of the same Type lower in the scope tree.

RunSpeech relies on events to continue driving the dialog—as described so far it would stop after running a single QA control. Event handlers are included for Prompt.OnComplete, Reco.OnReco, Reco.OnSilence, Reco.OnMaxTimeout, and Reco.OnNoReco. Each of these will be described in turn.

RunSpeechOnComplete works as follows:
(1) If the active Prompt object has an OnClientComplete function specified, it is called.
(2) If the active Prompt object was contained within a statement control, or a question control which had no active answer controls, RunSpeech is called.

RunSpeechOnReco works as follows:
(1) Some default binding happens—the SML tree is bound to the SML attribute and the text is bound to the SpokenText attribute of each control in ControlsToSpeechEnable.
(2) If the confidence value of the recognition result is below the ConfidenceThreshold of the active answer control, the Confirmation logic is run.
(3) Otherwise, if the active answer control has on OnClientReco function specified, it is called, and then RunSpeech is called.

RunSpeechOnReco is responsible for creating and setting the SML, SpokenText and Confidence properties of the ControlsToSpeechEnable. The SML, SpokenText and Confidence properties are then available to scripts at runtime.

RunSpeechOnSilence, RunSpeechOnMaxTimeout, and RunSpeechOnNoReco all work the same way:
(1) The appropriate OnClientXXX function is called, if specified.
(2) RunSpeech is called.

Finally, the Confirmation logic works as follows:
(1) If the parent QA control of the active answer control contains any confirm controls, the first active confirm control is found (the activation of a confirm control is determined in exactly the same way as the activation of a question control).
(2) If no active confirm control is found, RunSpeech is called.
(3) Else, the QA control is run, with the selected confirm control as the active question control.

For multi-modal browsers, only the grammar loading and event dispatching steps are carried out.

What is claimed is:

1. A computer readable storage medium having instructions, which when implemented by a computer generate client side markup for a client in a server/client system, the instructions comprising:
a set of controls defined on an authoring page for a website for defining visual renderings and at least one of recognition and audible prompting on a client in a server/client system, each control having a first set of attributes defined on the authoring page related to visual rendering and a second set of attributes defined on the authoring page related to at least one of recognition and audibly prompting, wherein one of the second set of attributes for one of the controls relates to a grammar to use for recognition, the controls being related to client side markup executable by a client browser, the set of controls accessing and using a first library for the visual rendering and a second library for the at least one of recognition and audibly prompting, the first library including methods for generating the client side markup and a plurality of event handlers, the first library further comprising a plurality of website authoring tools, the second library including markup information for performing the at least one of recognition and audibly prompting; and
a module operable on a computer, the module being configured to receive the authoring page, and wherein the module is further configured to generate, using the first and second set of attributes provided from the controls on the authoring page, client side markup executable by the client browser on the client in the server/client system in accordance with the controls and the attributes of the controls to perform both visual rendering and at least one of recognition and audibly prompting.

2. The computer readable storage medium of claim 1 wherein said one of the second set of attributes provides a reference to a location of the grammar.

3. The computer readable storage medium of claim 1 wherein the grammar is for one of speech recognition, handwriting recognition, gesture recognition and visual recognition.

4. The computer readable storage medium of claim 3 wherein the controls relate to one of HTML, XHTML, cHTML, XML and WML.

5. The computer readable storage medium of claim 1 wherein the controls relate to one of HTML, XHTML, cHTML, XML and WML.

6. The computer readable storage medium of claim 1 wherein one of the second set of attributes for one of the controls provides instructions related to generating audible output.

7. The computer readable storage medium of claim 6 wherein the instructions comprise text and the attribute relates to converting the text to audible output.

8. The computer readable storage medium of claim 1 wherein one of the second set of attributes for one of the controls relates to a location of data for audible output.

9. The computer readable storage medium of claim 8 wherein the data comprises a prerecorded audio data file and the attribute relates to playing the prerecorded audio data file.

10. The computer readable storage medium of claim 8 wherein the data comprises text and the attribute relates to converting the text to audible output.

11. A computer readable storage medium having instructions defined on an authoring page for a website, which when implemented by a computer generate client side markup for a client in a server/client system, the instructions comprising:
a first set of visual controls defined on the authoring page having attributes defined on the authoring page related to a first modality of interaction with a user of the client that being visual renderings on the client device, the first set of controls being related to client side markup executable by a client browser; and
a second set of controls defined on the authoring page having attributes defined on the authoring page related to a second modality of interaction with a user of the client that being at least one of recognition and audibly prompting, wherein attributes related to audible prompting include at least one of inline text for text-to-speech conversion, location of data for audible rendering and playing of a prerecorded audio file, the second set of controls using at least one of the first controls, the second set of controls being related to client side markup executable by a client browser, the first set of controls accessing and using a first library for the visual renderings, the second set of controls accessing and using a second library for the at least one of recognition and audibly prompting, the first library including methods for generating the client side markup and a plurality of event handlers, the first library further comprising a plurality of website authoring tools, the second library including markup information for performing the at least one of recognition and audibly prompting; and a module operable on a computer, the module being configured to receive the authoring page, which includes a plurality of the second set of controls, wherein the module is further configured to process the plurality of the second set of controls from the authoring page to generate client side markup from the first and second set of controls that is executable by the client browser on the client in the server/client system in accordance with the second set of controls and the attributes of the second set of controls for at least one of recognition and audibly prompting, and wherein the module is configured to use at least one of the first set of controls from the authoring page in order to generate markup herefrom when processing each of the second set of controls.

12. The computer readable storage medium of claim 11 wherein one of the attributes for the second set of controls relates to a grammar to use for recognition.

13. The computer readable storage medium of claim 12 wherein said one of the attributes provides a reference to a location of the grammar.

14. The computer readable storage medium of claim 12 wherein the grammar is for one of speech recognition, handwriting recognition, gesture recognition and visual recognition.

15. The computer readable storage medium of claim 14 wherein the first set of controls and the second set of controls relate to one of HTML, XHTML, cHTML, XML and WML.

16. The computer readable storage medium of claim 11 wherein the controls relate to one of HTML, XHTML, cHTML, XML and WML.

17. The computer readable storage medium of claim 11 wherein one of the second set of attributes for one of the controls provides instructions related to generating audible output.

18. The computer readable storage medium of claim 17 wherein the instructions comprise text and the attribute relates to converting the text to audible output.

19. The computer readable storage medium of claim 11 wherein one of the second set of attributes for one of the controls relates to a location of data for audible output.

20. The computer readable storage medium of claim 19 wherein the data comprises a prerecorded audio data file and the attribute relates to playing the prerecorded audio data file.

21. The computer readable storage medium of claim 19 wherein the data comprises text and the attribute relates to converting the text to audible output.

22. A computer readable storage medium having instructions, which when implemented by a computer generate client side markup for a client in a server/client system, the instructions comprising:

a first set of visual controls defined on an authoring page for a website having attributes defined on the authoring page related to a first modality of interaction with a user of the client that being visual renderings on the client device, the first set of controls being related to client side markup executable by a client browser; and a second set of controls defined on the authoring page for defining desired operation on the client device having attributes defined on the authoring page related to a second modality of interaction with a user of the client that being at least one of recognition and audible prompting, wherein attributes related to recognition include at least one of location of grammar for use in recognition and confidence level thresholds for recognition and wherein attributes related to audible prompting include at least one of inline text for text-to-speech conversion, location of data for audible rendering and playing of a prerecorded audio file, the second set of controls being selectively associated with the first set of controls and wherein values of the second set of controls are synchronized with the first set of visual controls, and the second set of controls being related to client side markup executable a client browser, the first set of controls accessing and using a first library for the visual renderings, the second set of controls accessing and using a second library for the at least one of recognition and audibly prompting, the first library including methods for generating the client side markup and a plurality of event handlers, the first library further comprising a plurality of website authoring tools, the second library including markup information for performing the at least one of recognition and audibly prompting; and a module operable on a computer, the module being configured to receive the authoring page, wherein the module is further configured to process the controls of the first set in the authoring page to generate client side markup for the first modality of interaction by incorporating the attributes in the controls that is executable by the client browser on the client in the server/client system in accordance with the controls of the first set and the attributes of the controls of the first set to perform both visual rendering, and wherein the module is further configured to process the controls of the second set to generate client side markup for the second modality of interaction by incorporating the attributes in the controls that is executable by the client browser on the client in the server/client system in accordance with the controls of the second set and the attributes of the controls of the second set in the authoring page to perform at least one of recognition and audibly prompting.

23. The computer readable storage medium of claim 22 wherein one of the attributes for the second set of controls relates to a grammar to use for recognition.

24. The computer readable storage medium of claim 23 wherein said one of the attributes provides a reference to a location of the grammar.

25. The computer readable storage medium of claim 23 wherein the grammar is for one of speech recognition, handwriting recognition, gesture recognition and visual recognition.

26. The computer readable storage medium of claim 25 wherein the first set of controls and the second set of controls relate to one of HTML, XHTML, cHTML, XML and WML.

27. The computer readable storage medium of claim 22 wherein the controls relate to one of HTML, XHTML, cHTML, XML and WML.

28. The computer readable storage medium of claim 22 wherein one of the second set of attributes for one of the controls provides instructions related to generating audible output.

29. The computer readable storage medium of claim 28 wherein the instructions comprise text and the attribute relates to converting the text to audible output.

30. The computer readable storage medium of claim 22 wherein one of the second set of attributes for one of the controls relates to a location of data for audible output.

31. The computer readable storage medium of claim 30 wherein the data comprises a prerecorded audio data file and the attribute relates to playing the prerecorded audio data file.

32. The computer readable storage medium of claim 30 wherein the data comprises text and the attribute relates to converting the text to audible output.

33. The computer readable storage medium of claim 22 wherein one of the attributes of the second set of controls relates to an identifier of the associated control of the first set of controls to form the association.

34. The computer readable storage medium of claim 22 wherein one of the attributes relates to whether the associated control of the second set is available for activation.

35. The computer readable storage medium of claim 34 wherein activation relates to generating markup.

36. The computer readable storage medium of claim 34 wherein activation relates to execution on the client.

37. The computer readable storage medium of claim 22 wherein the second set of controls activates another control of the second set.

38. The computer readable storage medium of claim 22 wherein the second set of controls comprise:
  a question control for generating markup related to audible prompting of a question; and
  an answer control for generating markup related to a grammar for recognition.

39. The computer readable storage medium of claim 38 wherein the question control activates the answer control.

40. The computer readable storage medium of claim 39 wherein the answer control includes a mechanism to associate a received result with one of the first set of controls.

41. The computer readable storage medium of claim 40 wherein mechanism includes binding the recognition value.

42. The computer readable storage medium of claim 41 wherein the mechanism includes issuing an event related to operation of binding.

43. The computer readable storage medium of claim 39 wherein the second set of controls comprise:
  a command control for generating markup related to a grammar for one of navigation in the markup, help with a task, and repeating an audible prompt.

44. The computer readable storage medium of claim 39 wherein the second set of controls comprise:
  a confirmation control for generating markup related to confirming that a recognized result is correct.

45. The computer readable storage medium of claim 44 wherein the confirmation control includes an attribute related to the recognized result to be confirmed.

46. The computer readable storage medium of claim 45 wherein the answer control includes an attribute related to a confidence level.

47. The computer readable storage medium of claim 45 wherein the confirmation control is activated as a function of a confidence level of a received result.

48. The computer readable storage medium of claim 47 wherein the confirmation control activates an accept control to accept the recognized result.

49. The computer readable storage medium of claim 47 wherein the confirmation control activates a deny control to deny the recognized result.

50. The computer readable storage medium of claim 47 wherein the confirmation control activates a correct control to correct the recognized result.

51. A computer implemented method for defining a website application on a server in a server/client architecture, the website application providing markup to a client for performing recognition and/or audible prompting on the client, the method comprising:
  defining the website application by creating an authoring page with a first set of visual controls having attributes defined on the authoring page related to a first modality of interaction with a user of the client that being visual rendering on the client device, and with a second set of controls having attributes defined on the authoring page related to a second modality of interaction with the user of the client that being at least one of recognition and audibly prompting, wherein attributes related to audible prompting include at least one of inline text for text-to-speech conversion, location of data for audible rendering and playing of a prerecorded audio file, and wherein the first set of controls and the second set of controls being related to client side markup executable by a client browser, wherein defining includes selectively associating controls of the second set of controls with at least one control of the first set of visual controls, the first set of controls accessing and using a first library for the visual rendering, the second set of controls accessing and using a second library for the at least one of recognition and audibly prompting, the first library including methods for generating the client side markup and a plurality of event handlers, the first library further comprising a plurality of website authoring tools, the second library including markup information for performing the at least one of recognition and audibly prompting; and
  processing the controls on the authoring page to generate client side markup including processing of the first set of visual controls to generate client side markup for the first modality of interaction executable by the client browser on the client in the server/client system in accordance with the controls of the first set and the attributes of the controls of the first set to perform visual rendering, and processing the controls of the second set to generate client side markup for the second modality of interaction by incorporating the attributes in the controls of the second set to perform at least one of recognition and audibly prompting.

* * * * *